United States Patent
Ohta et al.

(10) Patent No.: US 6,199,001 B1
(45) Date of Patent: Mar. 6, 2001

(54) CONTROL SYSTEM FOR CONTROLLING THE BEHAVIOR OF A VEHICLE BASED ON ACCURATELY DETECTED ROUTE INFORMATION

(75) Inventors: Takashi Ohta, Kita-machi; Kunihiro Iwatsuki; Kagenori Fukumura, both of Aichi, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 08/992,082

(22) Filed: Dec. 17, 1997

(30) Foreign Application Priority Data

Dec. 19, 1996 (JP) .................................................. 8-354518
Dec. 24, 1996 (JP) .................................................. 8-355567

(51) Int. Cl.$^7$ .............................. F16H 61/02; G01C 21/00
(52) U.S. Cl. ................................ 701/51; 701/54; 701/55; 701/208
(58) Field of Search .............................. 701/51, 54, 55, 701/65, 208, 209, 214, 216

(56) References Cited

U.S. PATENT DOCUMENTS

| | | | |
|---|---|---|---|
| 5,010,490 | 4/1991 | Nato et al. ........................ | 364/426.04 |
| 5,038,880 | 8/1991 | Matusoka et al. .................. | 180/179 |
| 5,128,869 | 7/1992 | Akishino et al. ...................... | 701/97 |
| 5,146,219 | * 9/1992 | Zechnall .............................. | 340/995 |
| 5,148,721 | 9/1992 | Anan et al. ............................. | 74/866 |
| 5,257,188 | 10/1993 | Sakakibara et al. .............. | 364/424.1 |
| 5,315,295 | * 5/1994 | Fujii ..................................... | 340/936 |
| 5,485,161 | * 1/1996 | Vaughn ................................ | 342/357 |
| 5,504,482 | * 4/1996 | Schreder .............................. | 340/995 |
| 5,598,335 | 1/1997 | You ................................. | 364/424.094 |
| 5,695,020 | 12/1997 | Nishimura .............................. | 180/169 |
| 5,749,063 | 5/1998 | Sakonjyu et al. ........................ | 701/93 |
| 5,771,007 | 6/1998 | Arai et al. .............................. | 340/903 |
| 5,832,400 | * 11/1998 | Takahashi et al. ....................... | 701/53 |
| 5,835,008 | 11/1998 | Colemere, Jr. ........................ | 340/439 |
| 5,839,534 | 11/1998 | Chakraborty et al. ................ | 180/169 |
| 5,884,208 | 3/1999 | Byon ..................................... | 701/110 |
| 5,890,991 | 4/1999 | Sakakiyama ............................ | 477/48 |
| 5,893,894 | * 4/1999 | Moroto et al. ........................... | 701/53 |
| 5,902,345 | 5/1999 | Minowa et al. ........................ | 701/96 |
| 5,913,377 | 6/1999 | Ota et al. ............................... | 180/244 |
| 5,945,799 | 8/1999 | Shimizu ................................ | 318/587 |
| 5,952,939 | 9/1999 | Nakazawa et al. .................. | 340/903 |
| 6,032,098 | * 2/2000 | Takahashi et al. .................... | 701/210 |

FOREIGN PATENT DOCUMENTS

| | | |
|---|---|---|
| 0 745 788 | * 12/1996 | (EP) . |
| 0 752 548 | * 1/1997 | (EP) . |
| 6-1353549 | 5/1994 | (JP) . |
| 7-306998 | 5/1994 | (JP) . |
| 5-262251 | 12/1994 | (JP) . |
| 7-85392 | 3/1995 | (JP) . |
| 8-72591 | 3/1996 | (JP) . |

* cited by examiner

*Primary Examiner*—Michael J. Zanelli
(74) *Attorney, Agent, or Firm*—Kenyon & Kenyon

(57) ABSTRACT

A control system for a vehicle includes a route information detector, which detects route information for the vehicle, and behavior control system, which is controlled by the route information detector and which controls the behavior of the vehicle. The control system also includes a means for detecting the accuracy of the detection of the route information, and a changing controller which changes the control of the behavior control system based on the accuracy of the detection of the route information. In this case, the behavior control system can be a transmission, a suspension system, a brake system, a steering system, an engine, or an auto drive control system. The behavior control system is controlled by control patterns that can be changed by a changing controller.

16 Claims, 19 Drawing Sheets

| | C₀ | C₁ | C₂ | B₀ | B₁ | B₂ | B₃ | B₄ | F₀ | F₁ | F₂ |
|---|---|---|---|---|---|---|---|---|---|---|---|
| N | ○ | | | | | | | | | | |
| REV | | | ○ | ○ | | | | ○ | | | |
| 1ST | ○ | ○ | | | | | | ● | ○ | | ○ |
| 2ND | ● | ○ | | | | | ○ | | ○ | | |
| 3RD | ○ | ○ | | | ● | ○ | | | ○ | ○ | |
| 4TH | ○ | ○ | ○ | | | △ | | | ○ | | |
| 5TH | | ○ | ○ | ○ | | △ | | | | | |

CONTROL SYSTEM FOR CONTROLLING THE BEHAVIOR OF A VEHICLE BASED ON ACCURATELY DETECTED ROUTE INFORMATION

BACKGROUND OF THE INVENTION

1. Field of the Invention

This invention is directed to a control device for a vehicle, which controls the behavior of the vehicle based on information regarding the route that the vehicle follows. This information is output by a route information detector.

2. Related Art

Generally a vehicle has a behavior control system, for example, an engine or a transmission. Control patterns applied to the behavior control system are either manually selected by the driver or automatically based on selected driving conditions detected by various sensors. But, both ways of selecting the control patterns are executed after encountering an actual vehicle condition change, hence behavior controls of the vehicle are delayed relative to actual road conditions, so it is possible to make the drivability of the vehicle worse.

Recently, it has become possible for a route information detection system, for example, a navigation system, to detect in advance information regarding the road conditions on which the vehicle travels, and this information is used to control the control patterns which are applied to the engine and automatic transmission in order to control the behavior of the vehicle as desired. An example of a vehicle control system is disclosed in Japanese Laid Open Publication No. HEI 8-72591.

In the above mentioned application, the vehicle control system for a vehicle has a location detection means, which detects the present location of the vehicle, a operating road predicting means, which predicts the future location of the vehicle in a few seconds later by referring to an electronic map, a running resistance measuring means, which measures the present load condition of driving systems of the vehicle, a driving force predicting means, which predicts the driving force at the predicted future location of the vehicle by correcting the present load condition on the basis of slope information from the electronic map, a driving system control unit, which controls in advance either the engine or the automatic transmission in order to get sufficient driving force of the predicted driving force to correspond and furthermore to reduce fuel consumption as much as possible, and a running locus recording means, which detects the information on the vehicle speed, and records and accumulates this information in the electronic map.

According to the above mentioned control system, by controlling the engine or the automatic transmission to get a predicted driving force, which corresponds to the condition of future location of the vehicle, and which is determined by the driving force predicting means, the vehicle is able to maintain the appropriate driving force for the road condition. Furthermore, it improves the drivability on an actual road condition by reflecting the driver's intention to the control of the driving force.

In the above mentioned control system of the vehicle, because the route information is detected on the basis of radio waves from man-made satellites and the signals from various sensors, if the vehicle operates in places where the radio waves barely reach or the sensors fail, it is possible not to detect the correct route. As a result, the problem arises that the driving force of the vehicle is inappropriate to the road condition and the drivability deteriorates.

One of the examples, which deals with this problem, is an invention disclosed in Japanese Patent Laid Open Publication No. 5-262251. A control system for a vehicle has a running information output means, which outputs the information about the location of the vehicle, a moving condition control means, which controls the condition of the vehicle on the basis of the output of the running information, and a control rule changing means, which changes the rule on the basis of whether the running information output means is normal or not. So, even if the running information output means has failed, the control for the vehicle controls the vehicle without deteriorating the accuracy of the driving performance.

Although, it is possible that the outputted information includes an error within a certain degree, even if the running information output means, which outputs the information, is operating normally. Under this circumstance, if the predetermined moving condition control, which is appropriate to the fail condition of the information output means, is executed, the moving condition of the vehicle does not adapt to the road condition. As a result, it is possible that the drivability deteriorates.

But in the control system for the vehicle, disclosed in the HEI 5-262251, the control rules for the moving condition control means are automatically changed on the basis of whether the information, which is normal or fail. So, if the information output means deteriorates and consequently, the accuracy of the information is bad, and as the moving condition control is executed based on either the normal rule or the failure rule, it is difficult to meet the actual situation.

SUMMARY OF THE INVENTION

One object of the present invention is to provide a control system for a vehicle that is able to control the behavior of the vehicle precisely based on the accuracy of detected route information.

A control system built according to the present invention is described in the following. The control system defines the accuracy of information detected by the navigation system, and changes the control patterns which are applied to the behavior control system corresponding to the detected accuracy of the route information. At least one of the following defines the accuracy of detected of the route information; the location of the vehicles position, detected by a first data detecting unit and a second data detecting unit of a navigation system, and map data stored in the data recording medium of the navigation system, are compared with each other to determine the accuracy of the route information; the location the present vehicle position by the first data detecting unit and the second data detecting unit or the map data stored in the data recording medium, are compared with each other to determine the accuracy of the route information detected by the second data detecting unit or the map data stored in the recording medium; the place where the vehicle is operating determines the accuracy of the route information detected by the second data detecting unit by itself; the map data stored in the recording medium determines the accuracy of the route information detected by the first data detecting unit and the second data detecting unit; or the map matching condition detects the accuracy of the route information.

At least one of the following changes the control patterns which are applied to the control of the behavior control system corresponding to the accuracy of the route information; according to the accuracy of corner information, the automatic transmission is down shifted; according to the accuracy of down slope information, the automatic transmission is prohibited from shifting up; according to the accuracy of climbing road information, the automatic transmission changes its shift pattern of the shift diagram to the power pattern; according to the accuracy of down slope information, the brake system is controlled by its oil pressure; according to the accuracy of congestion information, the vehicle auto drive control is canceled or initiated; according to the accuracy of the surface condition of the road, the damping force of the suspension is changed; according to the accuracy of the surface condition of the road, the power assist of the steering wheel is changed; according to the accuracy of congestion, the engine is controlled to decrease its fuel consumption.

According to invention, the control patterns which are applied to the control of the behavior control system, which include, the engine control, the transmission control, and the suspension control, the brake control, the steering control, the vehicle auto drive control, are changed corresponding to the accuracy of the route information, which is detected by an information detection device. So, it is possible to precisely control and conform the behavior of the vehicle to the actual driving route condition. Thus, the capability of the power train, the stability and controllability, drivability, and comfort are improved.

DETAILED DESCRIPTION

Figure 1:
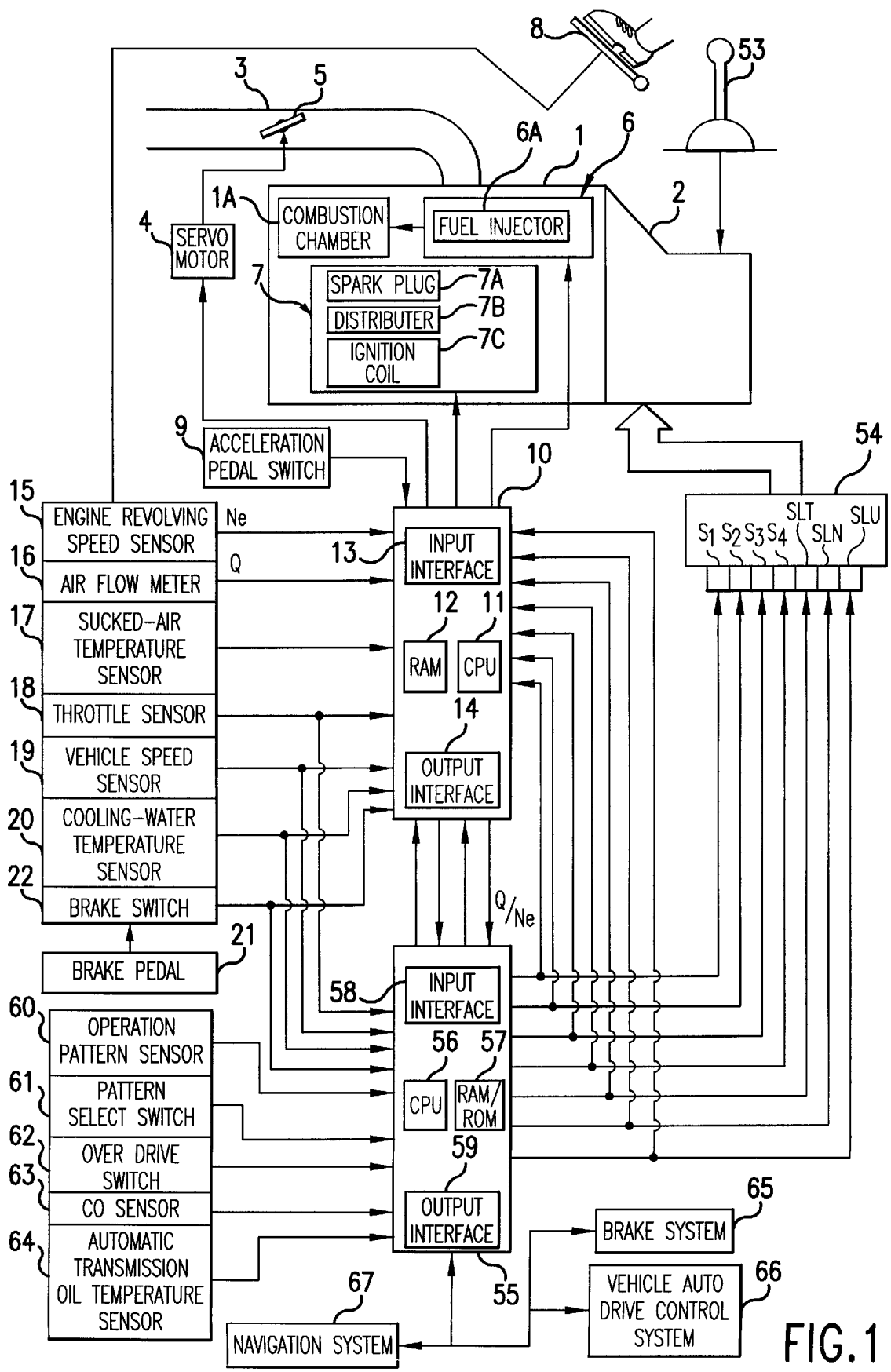
FIG. 1 is a block diagram showing a vehicular control system to which is applied the present invention.

The entire disclosure of Japanese Patent Application HEI 8-354518 filed on Dec. 19, 1996 and HEI 8-355567 filed on Dec. 24, 1996 including specification, claims drawings and summary are incorporated herein by reference in their entirety. The present invention will be described more specifically with reference to the accompanying drawings. First of all, here will be described the summary of a vehicle to which is directed the present embodiment. In FIG. 1, there is connected to the output side of an engine 1 acting as a power source, an automatic transmission 2, which is exemplified by transmission gear stages. The output power of the engine 1 is electrically controlled, and an intake manifold 3 of the engine 1 is provided with an electronic throttle valve 5, which is driven by a servo motor 4. The engine 1 is provided with a fuel injection control unit 6, including a fuel injector 6A, which controls the amount of the fuel injection in the combustion chamber 1A, and an ignition timing adjusting unit 7, including a spark plug 7A, a distributor 7B, and an ignition coil 7C. An opening amount of an acceleration pedal 8, which is used to control the output power of the engine 1, is detected by an acceleration pedal switch 9. The acceleration pedal switch 9 generates a signal indicative of the operating amount of the acceleration pedal 8, which is applied to the engine electronic control unit (E-ECU) 10. The engine electronic control unit 10 is comprised of a micro computer, which incorporates a central processing unit CPU) 11, a random-access memory (RAM) 12, an input interface circuit 13, and an output interface circuit 14. The engine electronic control unit 10 is fed with various kinds of data to control the engine 1, for example, data from an engine revolving speed sensor 15 for detecting the revolving speed of the engine (Ne), data from an air flow meter 16 for detecting the quantity of intake-air (Q), an intake-air temperature sensor 17 for detecting the temperature of intake air, and a throttle sensor 18 for detecting the opening degreeΘ of the electronic throttle valve 5. Furthermore, the engine electronic control unit 10 is fed with data from a vehicle speed sensor 19 for detecting vehicle velocity in accordance with the revolving speed of the output shaft of the automatic transmission 2 or the like, cooling water temperature sensor 20 for detecting the temperature of cooling water for the engine 1, and a brake switch 22 for detecting the amount of the operation of brake pedal 21. The engine electronic control unit (E-ECU) 10 calculates data, which are from various sensors and switches, in order to determine the operating condition of the vehicle. At least one of the following is controlled based on the operating condition: opening of the electronic throttle valve 5, the amount of the fuel injection of the fuel injection control unit 6, or the ignition timing of the ignition control unit 7. The engine electronic control unit (E-ECU) 10 and navigation systems are connected to communicate with each other to exchange data. It is possible that the engine electronic control unit (E-ECU) 10 controls at least one of the opening of the electronic throttle valve 5, the amount of the fuel injection of the fuel injection control unit 6, or the ignition timing of the ignition control unit 7 based on the route data output from the navigation system, which indicates the route that the vehicle will follow. So the engine electronic control unit (E-ECU) 10 stores the standard data, which will be corrected by correspondence of the road information to the route, to control the opening of the electronic throttle valve 5, the amount of the fuel injection of the fuel injection control unit 6, or the ignition timing of the ignition control unit 7.

Figures 2, 3:
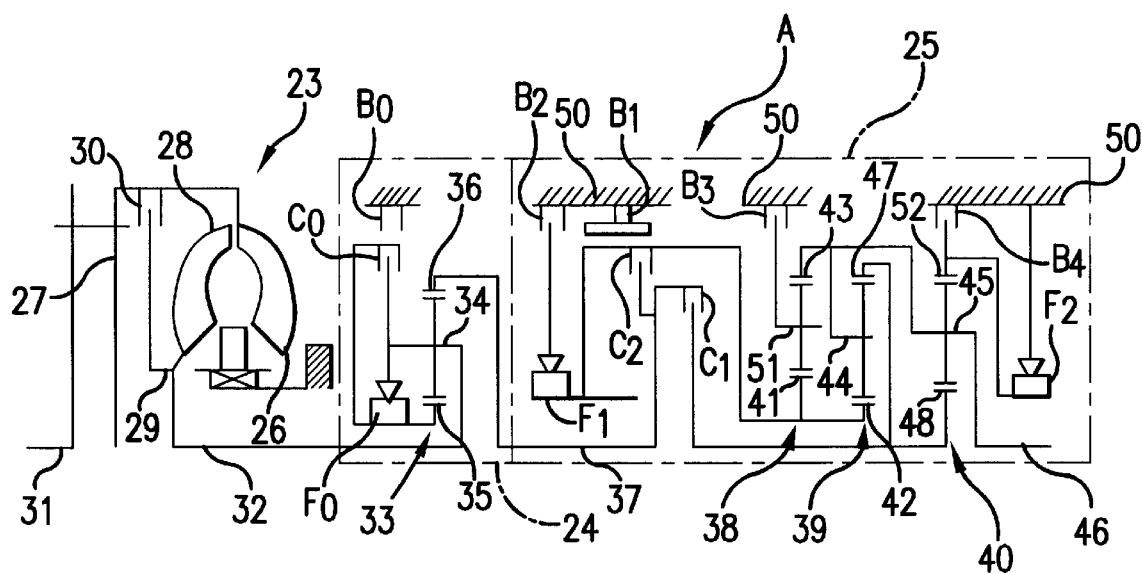
FIG. 2 is a skeleton diagram showing an example of a gear train of an automatic transmission according to the present invention.
FIG. 3 is a table showing the engagement of friction engagement units for setting gear stages in the automatic transmission.

FIG. 2 shows one example of the automatic transmission 2 which is applied to this embodiment of the present invention. It is structured to be capable of setting five forward and one reverse gear stages; five forward gear stages that do not have non-continuous gear ratio. The automatic transmission 2 has a torque converter 23, a sub-transmission section 24, and a main transmission section 25. The torque converter 23 has a front cover 27, which is attached to a pump impeller 26, a member which is attached to a turbine runner, in other words, hub 29, and a lock up clutch.

The front cover 27 is connected to a crank shaft 31 of the engine 1. An input shaft 32 of the automatic transmission 2 connected to the turbine runner 28 is connected to a carrier 34 of a planetary gear unit 33, which is the sub-transmission section 24 for the over drive gear stage. A multiple frictional clutch CO and a one-way clutch OF are provided between the sun gear 35 and the carrier 34 which construct the planetary gear system 33. This one way clutch OF is arranged to be engaged when the sun gear 35 relatively rotates in the direction of positive rotation against the carrier 34, in other words, when it rotates in the same direction of the input shaft 32. A ring gear 36, which is the output element of the sub transmission section 24, is connected to the intermediate shaft 37, which is the input element of the main-transmission section 25. A brake B0 is disposed to selectively stop the rotation of the sun gear 35. The sub-transmission section 24, when the clutch or the one way clutch F0 is engaged, and the planetary gear unit rotate integrally, and the intermediate shaft 37 rotates the same speed as the input shaft 32. At this time the sub-transmission section 24 forms the low gear stage. When the brake B0 engages to stop the rotation of the sun gear 35, the speed of the ring gear 36 is faster than the input shaft 32 and it positively rotates. At this time the sub-transmission section 24 forms the high gear stage. The main-transmission section 25 has three planetary gear units 38, 39, and 40. Rotational members of these planetary gear units is connected as follows. A sun gear 41 of the first planetary gear unit 38 and a sun gear 42 of the second planetary gear unit 39 are integrally connected to each other. A ring gear 43 of the first planetary gear unit 38, a carrier 44 of the second planetary gear unit 39, and a carrier 45 of the third planetary gear unit 40 are connected to each other. The carrier 45 is connected to an output shaft 46. A ring gear 47 of the second planetary gear unit is connected to a sun gear 48 of the third planetary gear unit.

This main-transmission 25 section is able to interchange a reverse gear stage and four forward gear stages. To establish gear stages, the clutches and brakes are disposed as follows. A first clutch C1 is disposed between the ring gear 47 connected to the sun gear 48 and the intermediate shaft 37. A second clutch C2 is disposed between the sun gear 41 and the first planetary gear unit 38, and is connected to the sun gear 42, the second planetary gear unit 39, and the intermediate shaft 37. A band type first brake B1 is disposed for stopping rotations of the sun gear 41 of the first planetary gear unit 38 and the sun gear 42 of the second planetary gear unit 39. A first one way clutch F1 and a multiple friction plate type second brake B2 are in series disposed among the sun gear 41, the sun gear 42 and the housing 50. The first one way clutch F1 is arranged to be engaged when the sun gear 41 and the sun gear 42 are inversely rotated opposite to the direction of the rotation of the input shaft 32.

A third brake B3 is disposed between the carrier 51 of the first planetary unit 38 and housing 50. A fourth brake B4 and a second one way clutch F2 are in parallel disposed between the ring gear 52 and housing 50. The second one way clutch F2 is arranged to be engaged when the ring gear 52 is rotated inversely.

The foregoing automatic transmission 2 is able to set any one of the five forward and reverse gear stages. The states of engagements are release of each frictional engagement unit for setting the gear stages are shown in an engagement operation table depicted in FIG. 3. Referring to FIG. 3, mark ○ indicates an engaged state, mark ● indicates an engaged state when the vehicle is in the engine braking state, Δ indicates either an engaged state or released state is good, and no mark indicates a released state.

In this embodiment, the vehicle has a shift lever operable by the driver. The driver can select the operation position, namely, Park "P," Reverse "R," Neutral "N," Drive "D," Third "3" covering the gear stages of the third speed, Second "2" covering the gear stages of the second speed, and Low "L" covering the gear stage of the first speed.

A hydraulic control device 54 is used to achieve the gear stage or shift change of the automatic transmission 2, to engage or release a lock up clutch 30, line pressure of the oil, and oil pressure for the engaging the frictional engagement unit. The hydraulic control device is controlled by the transmission control unit 55. It has three solenoids, S1, S2, and S3 for shifting the gear stage of the automatic transmission 2 and one solenoid, S4, for establishing an engine braking effect. It has three linear solenoids, a first one is SLT for producing a line oil pressure of an oil circuit, a second one is SLN for controlling an accumulator back pressure of an accumulator during the shift changing of the automatic transmission 2, and a third one is SLU for controlling the oil pressure of the lock-up clutch and specific frictional engagement units.

Control signals are sent from the transmission electronic control unit (T-ECU) 55 to the hydraulic control device 54. The gear stage of the automatic transmission 2, producing the line oil pressure of an oil circuit, and controlling the accumulator back pressure, is controlled on the basis of the signals. The shifting control unit is mainly of a microcomputer, which incorporates a central processing unit (CPU) 56, memories (RAM, ROM) 57, an input-interface circuit 58, and an out-put interface circuit 59. The transmission electronic control unit 55 receives data for controlling the automatic transmission 2, for example, from the throttle sensor 18, from the vehicle speed sensor 19, from the engine cooling water temperature sensor 20, from the brake switch 22, from the operation position sensor 60 for detecting the operated position of the shift lever which is manually operated, from a shift pattern select switch for selecting the shift patterns, which the automatic transmission 2 obeys, from an overdrive switch 62, from an input shaft revolving sensor for detecting the revolving speed of the frictional engagement unit CO, and from an oil temperature sensor 64 for detecting the oil temperature in the automatic transmission 2.

The transmission electronic control unit (T-ECT) 55 and the engine electronic control unit (E-ECU) 10 are connected to communicate with each other; the engine electronic control unit 10 sends signals, for example, the quantity of intake air per cycle (Q/Ne) and the transmission electronic control unit 55 sends signals, for example, the equivalent signal for controlling the solenoids and the signals that indicate the gear stage that the automatic transmission 2 selects. The transmission electronic control unit 55 determines the operating condition of the vehicle on the basis of the signals from various sensors and switches. It compares the operating condition and a shift diagram (or a shift map) in which the individual gear regions of forward stages are set by adopting the vehicle speed and the throttle opening, as parameters. By using the result of this comparison, it controls the gear stage, the engagement or release of the lockup clutch, the line pressure of the oil circuit, and the degree of the oil pressure of the engagement for the frictional engagement units.

The transmission electronic control unit (E-ECT) 55 and a navigation system which will be explained lately, are connected to communicate with each other. The navigation system sends signals, for example, data about the operating route. The transmission electronic control unit (E-ECT) 55 controls the automatic transmission 2 on the basis of the signals from the navigation system. The transmission electronic control unit 55 stores the standard data and the procedures of the calculations in order to control the automatic transmission 2 in accordance with the condition of the operating route.

The transmission electronic control unit 55 outputs indication signals for the automatic transmission 2 on the basis of the signals from the various sensors and switches. It determines if there is a failure in the various solenoids based on the signals from the various sensors and switches. Preparing for the failure, the transmission has a fail safe function to control the automatic transmission 2 safely without preventing operating of the vehicle.

Figure 4:
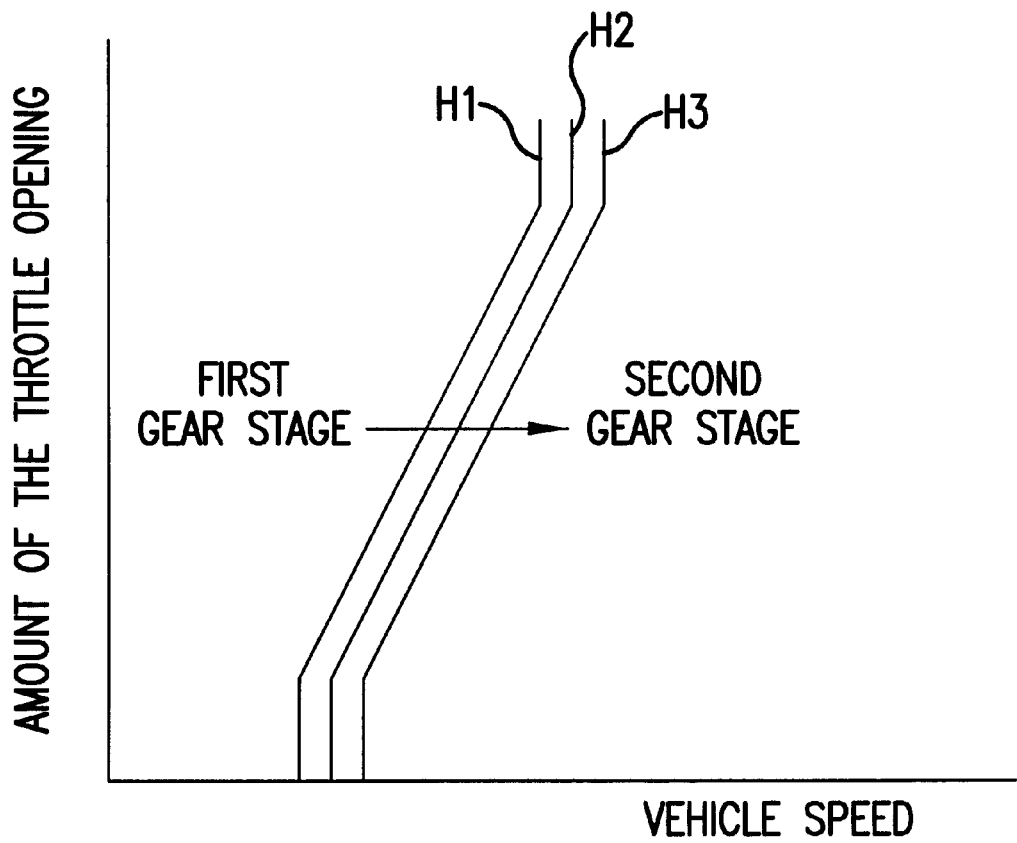
FIG. 4 is a one of the shift boundary lines, which is applied to the shift control of the automatic transmission disclosed in FIG. 1 and FIG. 2.

FIG. 4 shows an example of a map of shift boundary lines applied to the control of the automatic transmission 2. This map of the shift boundary lines are predetermined on the basis of a an operating speed V of the vehicle and the opening amount of the accelerate pedal. The example in FIG. 4 shows shift up boundary lines corresponding to the economy pattern, the normal pattern, and the power pattern. The shift boundary H1 of the economy pattern is set lower speed side of the shift boundary H2 of the normal pattern, the shift boundary H3 of the power pattern is set on the higher speed side of the shift boundary H2 of the normal pattern. Furthermore, it is possible to set the shift map for the snow pattern which always sets the second gear stage when the vehicle starts to go. The selection of the shift patterns is executed by the drivers operation of the select pattern switch 61. And it is possible to select the shift map automatically on the basis of route information which is detected by the navigation system. The means for selecting the shift map automatically incorporates the means for storing plural shift maps in the transmission electronic control units 55, the means for reading one of the shift maps, and the means for controlling the automatic transmission based on the selected map. It is possible to use the means for correcting the standard map by calculating on the basis of the information pattern, and to control the automatic transmission based on the corrected shift map.

Figure 5:
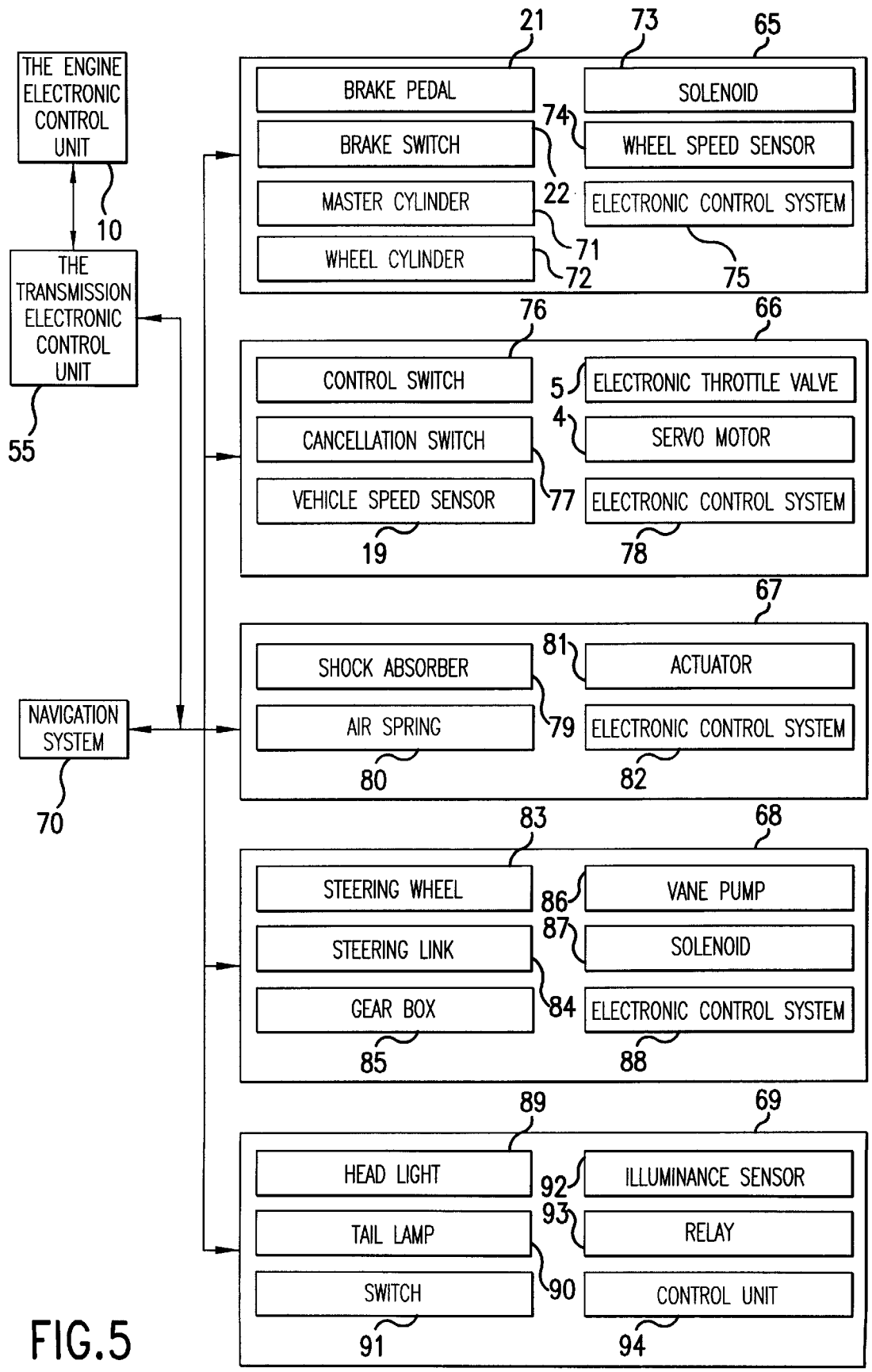
FIG. 5 is a block diagram showing an example of a behavior control system to which is applied the control system of the present invention.

As shown in FIG. 1, a vehicle control system has a brake system 65, a vehicle auto drive control system 66, a suspension system 67, a steering system 68, a lighting system 69, and a navigation system 70. As shown in FIG. 5, the brake system 65 includes a brake pedal 21 which is operated by the driver, a brake switch 22 for detecting the amount of the operation of the brake pedal 21, and a master cylinder 71 which converts the operation power of the brake pedal 21 into the oil pressure. The brake system 65 has a wheel cylinder 72 to which is delivered the oil pressure electrically, wheel sensors 74 detect the revolving speed of each wheel individually, and the electronic control system 75, which controls these elements on the basis of the operation of the brake pedal 21 and the driving condition of the vehicle.

The brake system 65 has a wheel cylinder 72, to which is delivered the oil pressure electrically, wheel sensors 74 detect the revolving speed of each wheel individually, and the electronic control system 75, which controls these elements on the basis of the operation of the brake pedal 21 and the operating condition of the vehicle. The brake system 65 has a wheel cylinder 72 to which is delivered the oil pressure from the master cylinder 71, solenoid valves which control the oil pressure electrically, wheel sensors 74 which detect the revolving speed of each wheel individually, and the electronic control system 75 which controls these elements on the basis of the operation of the brake pedal 21 and the operating condition of the vehicle. The brake system 65 creates a braking force when the oil pressure is applied to the wheel cylinders 72 by operating of the brake pedal 21, and has an anti lock brake function which prevents the wheels from locking by controlling the oil pressure of the wheel cylinders 72 on the basis of the signals detected by the wheel sensors 74. It is possible to have traction controlling the oil pressure of the wheel cylinders 72 of the brake system 65 and controlling the output torque of the engine 1 on the basis of the operating condition of the vehicle.

The brake system 65 and the navigation system 70 are connected to communicate with each other. It is possible to adapt the braking force by controlling the oil pressure to the wheel cylinders 72 on the basis of the information about the operating route detected by the navigation system 70. The electronic control system 75 stores the standard data and the procedures of the calculations in order to control the automatic transmission 2 in accordance with the condition of the operating route.

The vehicle auto drive control system 66 controls the engine 1 and the automatic transmission 2 in order to control the vehicle speed automatically. The vehicle auto drive control system 66 has a control switch 76 for setting the vehicle speed, a cancellation switch 77 for canceling the vehicle auto drive control, a vehicle speed sensor 19 for detecting the vehicle speed, an electrically controlled throttle valve 5 provided in the intake manifold 3 of the engine 1, an electronic throttle valve 5 which is driven by an servo motor 4, and an electrical control system 75 for controlling these elements on the basis of the selected vehicle speed and the operating condition of the vehicle. An operation signal from the control switch 76 of the vehicle auto drive control system 66 is sent to the engine electronic control unit (E-ECT) 10 and the transmission electronic control unit (T-ECT) 55. These units control the amount of the opening of the electronic throttle valve 5 at the specific condition and the gear stage without the operation of the acceleration pedal 8. Consequently the speed of the vehicle is fixed. The vehicle auto drive control system 66 cancels the automatic speed control by detecting at least one of the operations, acceleration pedal 8 movement, brake pedal 21 movement, or shift lever 53 movement of the automatic transmission 2. The vehicle auto drive control system 66 and the navigation system 70, which will be explained later, are connected to communicate with each other. The navigation system 70 sends signals, for example, data about the operating route. It is possible to start or cancel the automatic speed control on the basis of the information on the operating route from the navigation system 70. The electronic control system 78 stores the standard data and the procedures of the calculations in order to control the vehicle auto drive control system 66 in accordance with the condition of the operating route.

The suspension system 67 mounts the body of the vehicle and controls the behavior of the vehicle, for example, the vibration of the body and the stability and the controllability. The suspension system 67 incorporates shock absorbers 79, which absorb shocks, air springs, 80 which absorb shocks, actuators 81, which control the damping force of the shock absorbers 79, and air springs 80, and the electronic control unit 82, which controls actuators 81.

The suspension system 67 improves the stability and controllability, and comfort by controlling damping force of the shock absorbers 79 and the air springs 80; damping force is controlled by the electronic control unit 82. The suspension system 67 and the navigation system are connected to communicate with each other. It is possible to control the damping force of the shock absorbers 79 and the air springs 80 on the basis of the signals from the navigation system 70.

The steering system 68, which controls the direction of the vehicle incorporates a steering 83, which is operated by the driver, a gear box 85, which transmits the rotation of the steering wheel 83 to a steering link 84, a vane pump 86, which supplies oil pressure to the gear box 85, solenoid valves 87, which electrically controls the oil pressure to the gear box 85, and an electronic control unit 88, which controls above mentioned elements. The operability of the steering wheel 83 is improved by controlling the oil pressure of the gear box 85 on the basis of the vehicle speed information from the speed sensor 19.

The steering system 68 and the navigation system are connected to communicate with each other. It is possible to control the oil pressure of the gear box 85 on the basis of the signals from the navigation system 70 and improve the operability of the steering wheel 83.

The lighting system 69 incorporates head lights 89, which are installed in the front part of the vehicle, tail lamps 90, which are installed in the back part of the vehicle, a light switch, which turns on or off the head lights 89 or the tail lamps 90 by the driver's operation, an illuminance sensor, which detects the illuminance around the vehicle and automatically turns on or off the head lights 89 or the tail lamps 90, a relay 93 which opens or shuts the electronic circuit connected to the head lights 89 or the tail lamps 90, and an control unit 94, which controls above mentioned elements.

The following navigation system 70 is provided for improving the stability, drivability and power performance of the vehicle by feeding data and the instruction signals to the aforementioned transmission electronic control unit 55, the engine electronic control unit 10, the brake system 65, and the vehicle auto drive control system 66. The navigation system 70 guides its vehicle to a predetermined target. This navigation system 70 is equipped, as shown in FIG. 5, with an electronic control unit 95, a first data detecting unit 96, a second data detecting unit 97, a player 98, a multiple audio visual system 99, and a speaker 100.

The electronic control unit 95 is a microcomputer which includes a central processing unit (CPU), a memory unit (RAM and ROM) 83, input interface 84, and output interface 85. The player 79 is used for reading out data which is stored in a data recording medium 105, for example, an optical disk or a magnetic disk. The data recording medium 105 stores not only data necessary for driving the vehicle, for example, place names, roads or main buildings along the roads but also specific road situations, for example, straight roads, curves, up slopes, down slopes gravel roads, sandy beaches, riverbeds, urban areas, mountain regions, ordinary roads, expressways, rivers, seas, paved or unpaved roads, rough or smooth roads, road signs, and traffic regulations.

Figure 6:
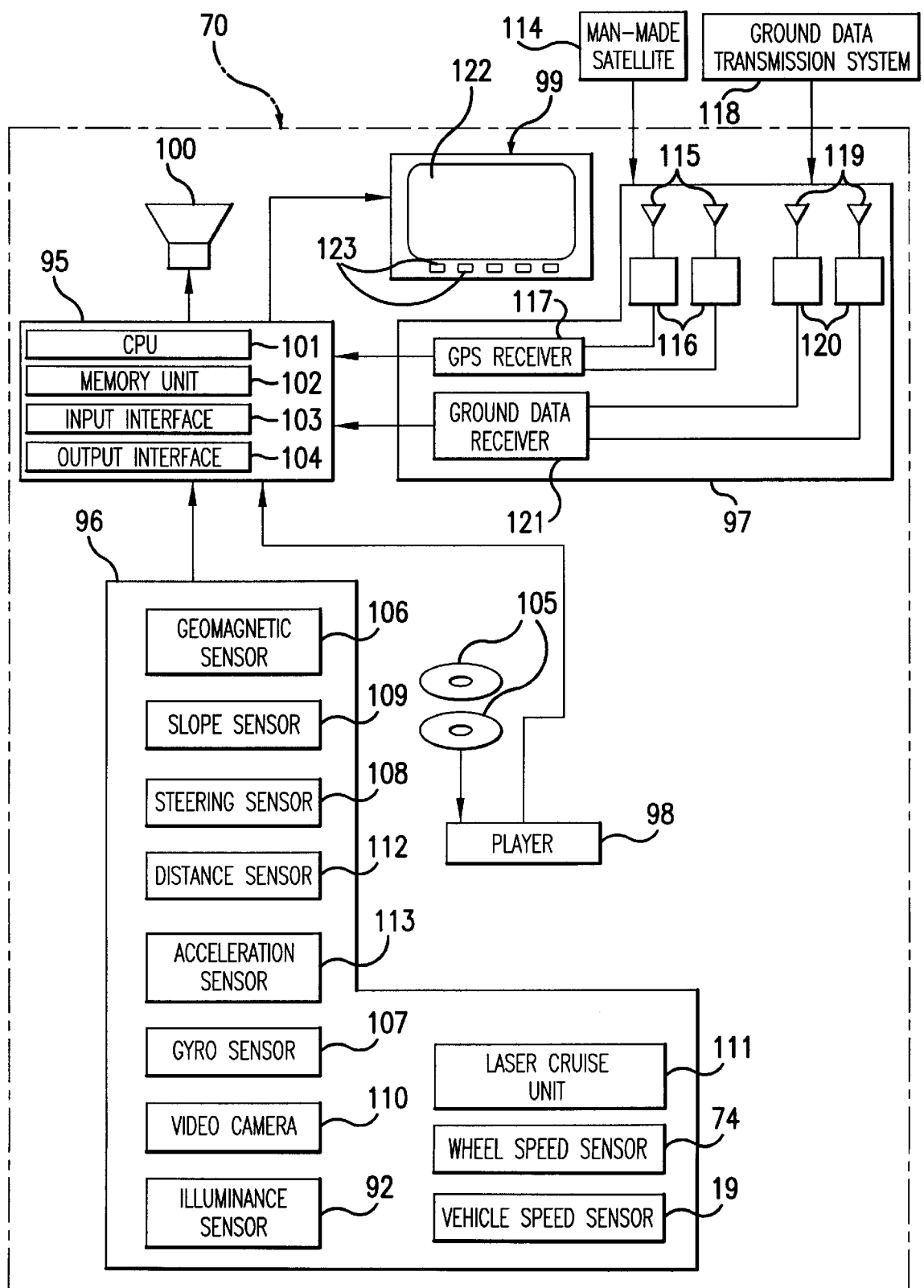
FIG. 6 is a block diagram showing an example of a navigation system to which is applied the control system of the present invention.
Figure 7:
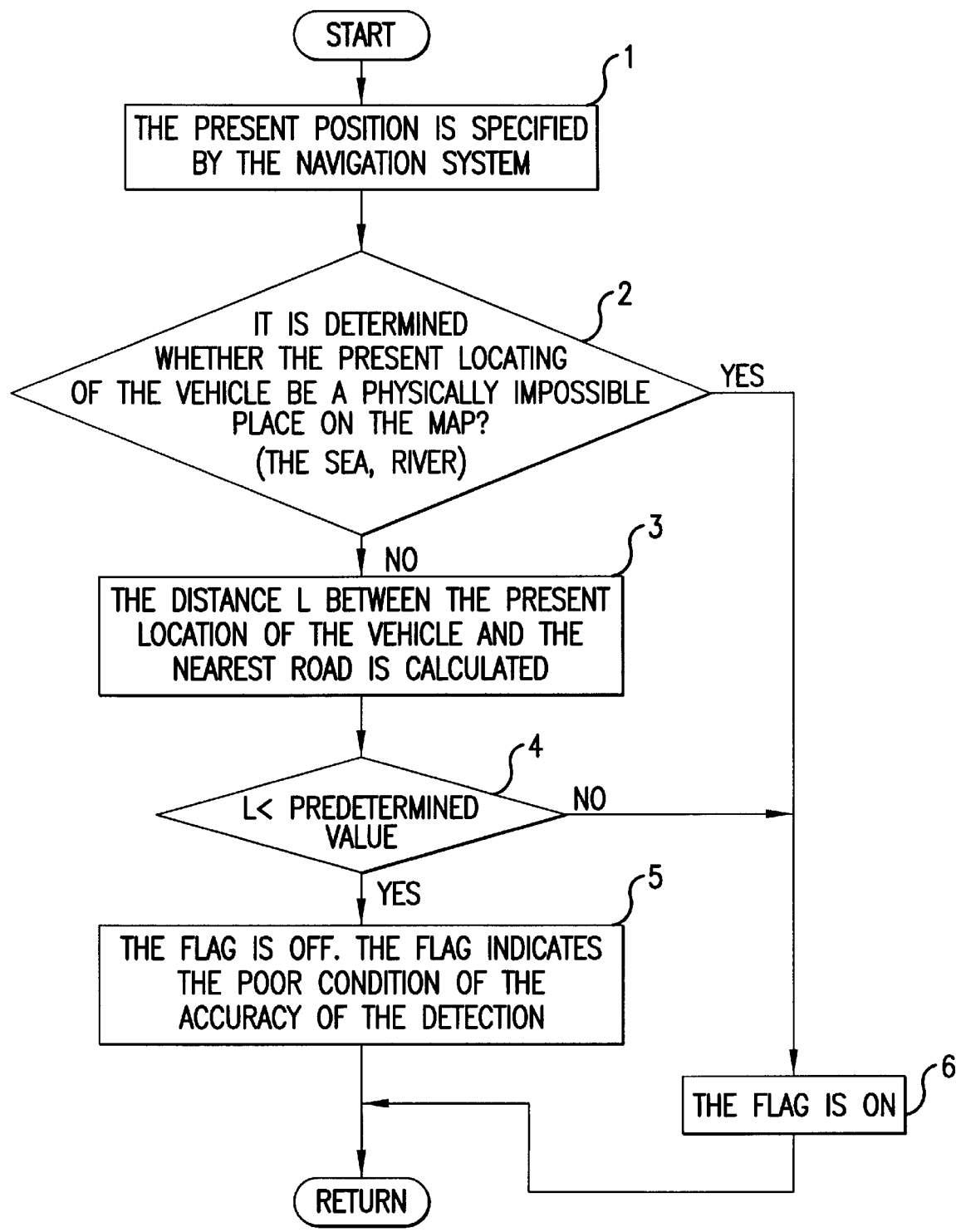
FIG. 7 is a flow chart showing an example of the control to be executed by the control system of the present invention.

FIG. 6. Shows one of the examples; the road data are digitized and stored in the data recording medium 105. Specifically, the road map is divided in a mesh shape, and each mesh is composed as a unit of nodes 87, and links 88 joining the nodes 87. The stored contents are attributes of the links 88 joining the nodes 87, for example, the latitudes and longitudes of roads, road numbers, road width, distance of straight roads, road slopes and radii of curves.

The aforementioned first data detecting unit 22 is used to detect the present position of its vehicle, the road situations and the distance from other vehicles by the self-contained navigation, and is composed of a geomagnetic sensor 106 for detecting the azimuth for driving the vehicle, a gyrocompass 107, and a steering sensor 108 for detecting the steering angle of the steering wheel 83.

The first data detecting unit 96 is equipped with a slope sensor for detecting the slopes of roads, a video camera 110 for recognizing a front vehicle and detecting the distance therefrom, a laser cruise unit 111, a distance sensor 112, a wheel speed sensor 74 for detecting the rotational speeds of the individual wheels separately, an acceleration sensor 113 for detecting the acceleration of the vehicle in all directions and a vehicle speed sensor 19 for detecting the revolving speed of the output shaft of the transmission. Here, the laser cruise unit 111 controls the throttle opening to keep a set vehicle speed when the front vehicle is not detected by the laser radar or when the distance from the front vehicle is sufficiently large.

The first data detecting unit 96 and the electronic control unit 95 are connected to transmit data so that data, as detected by the first data detecting unit 96, is transferred to the electronic control unit 95. The second data detecting unit 97 detects the present position of its vehicle, the road situations, other vehicles, blocks and the weather, and is composed of a GPS antenna 115 for receiving radio waves from a man-made satellite 114, an amplifier 116 connected with the GPS antenna 115, and a GPS receiver 117 connected with the amplifier 116. The second data detecting unit 97 is equipped with an antenna 119 for receiving radio waves from a ground data transmission system 118 such as a transmitter carried on another vehicle, a beacon or sign post disposed on the road side, a VICS (Vehicle Information & Communication System) or an SSVS (Super Smart Vehicle System), an amplifier 120 connected with the antenna 119, and a ground data receiver 121 connected with the amplifier 45.

The GPS receiver 117 and the ground data receiver 121 are so connected with the electronic control unit 95 as to effect data communications. Data, as detected by the second data detecting unit, are transferred to the electronic control unit 95.

The multiple audio visual system 99 has a display 122 which consists of a liquid crystal display or a cathode-ray tube (CRT) and various switches. The multiple audio visual system 99 displays data graphically, for example, the road to follow to the destination, the road situations of the roads, the present position of the vehicle, the presence and location of other vehicles, or the presence and location of blocks, and displays the operating modes corresponding to the predetermined sections of the road situations and the shift diagrams to be used for controlling the automatic transmission 2 on the basis of data stored in the data recording medium 105 or first and second data detecting unit 96 and 97. Incidentally, the various data are displayed in the display 106 and outputted as voices from the speaker 100.

With the multiple audio visual system 99, there are connected a various switches 107, which can be operated to control the first data detecting unit 96 or the second data detecting unit 97, to set the destination and the road to follow, to set or change the predetermined sections in the roads, to enlarge or reduce the size of the map, and to display and change the shift map to be applied for controlling the automatic transmission 2.

In the navigation system 70, data of the road which the vehicle will follow, as detected by the first data detecting unit 96, as detected by the second data detecting unit 97, and the map data, as stored in the data recording medium 105 are synthetically compared or evaluated to determine the road situations of or round the present position of the vehicle on the route being followed The result of the comparison, the road situation, is indicated in the display 106 or the speaker 100.

Detection errors may be caused in the individual sensors when the present position is to be determined on the basis of data to be detected by the first data detecting unit 96. Therefore, controls are preformed to absorb the errors by the map matching method. This map matching method is a control to correct the present position of the vehicle by comparing the operating locus of the vehicle, as detected from the signals of the various sensors, and the map data as stored in the data recording medium 105.

The followings are examples of this invention. One control example judges the accuracy of detection of the route information detected by the navigation system 70, and the other example changes the control patterns which are applied to the control of the behavior control system corresponding to the accuracy of the route information.

Examples of control flows disclosed in FIGS. 7 to 11 include the means for detecting the accuracy of the detection of the route information. The control flow in FIG. 7 judges the accuracy of the route information by comparing the location of the present vehicle position, detected by the first data detecting unit 96 and the second data detecting unit 97, and the map data stored in the data recording medium 105.

First of all, at Step 1, the driver's operation for the setting the destination and the indication of the map of the route is executed by using the switches 123 of the multiple audio visual system 99. The present position of the vehicle and the road ahead of the present position can be specified by data of the first data detecting unit 96 and the second data detecting unit 97.

At Step 2, the present locating determined at Step 1 is referred to the map data stored in the data recording medium 105, and it is determined whether the present location of the vehicle is a physically impossible place on the map, which is far from the land at a predetermined distance, for example, on the sea on the map, or on a river on the map.

If the answer of Step 2 is NO, the control flow goes to Step 3, the distance L between the present location of the vehicle and the nearest road is calculated. At Step 4, it is decided whether the distance determined at Step 3 is smaller than the predetermined value. If the answer of Step 4 is NO, the control flow goes to Step 5, because the accuracy of detection of the route information is better than a predetermined degree, a flag is turned OFF, which flag in the ON state indicates the poor accuracy of the detection of the first data detecting unit 96 and the second data detecting unit 97, and control flow returns. If the answer of the Step 2 is YES or the answer of the Step 4 is NO, the control flow goes to Step 6, because the map data stored in the recording medium 105 has a priority over the first data detecting unit 96 and the second data detecting unit 97, the accuracy of the detection of the first data detecting unit 96 and the second data detecting unit 97 are poor, and flag is turned ON. This flag indicates the poor accuracy of the detection. And the control flow returns. Steps 2, 3, 4, 5, and 6 corresponding to the means for detecting accuracy of the detection of the information.

Figure 8:
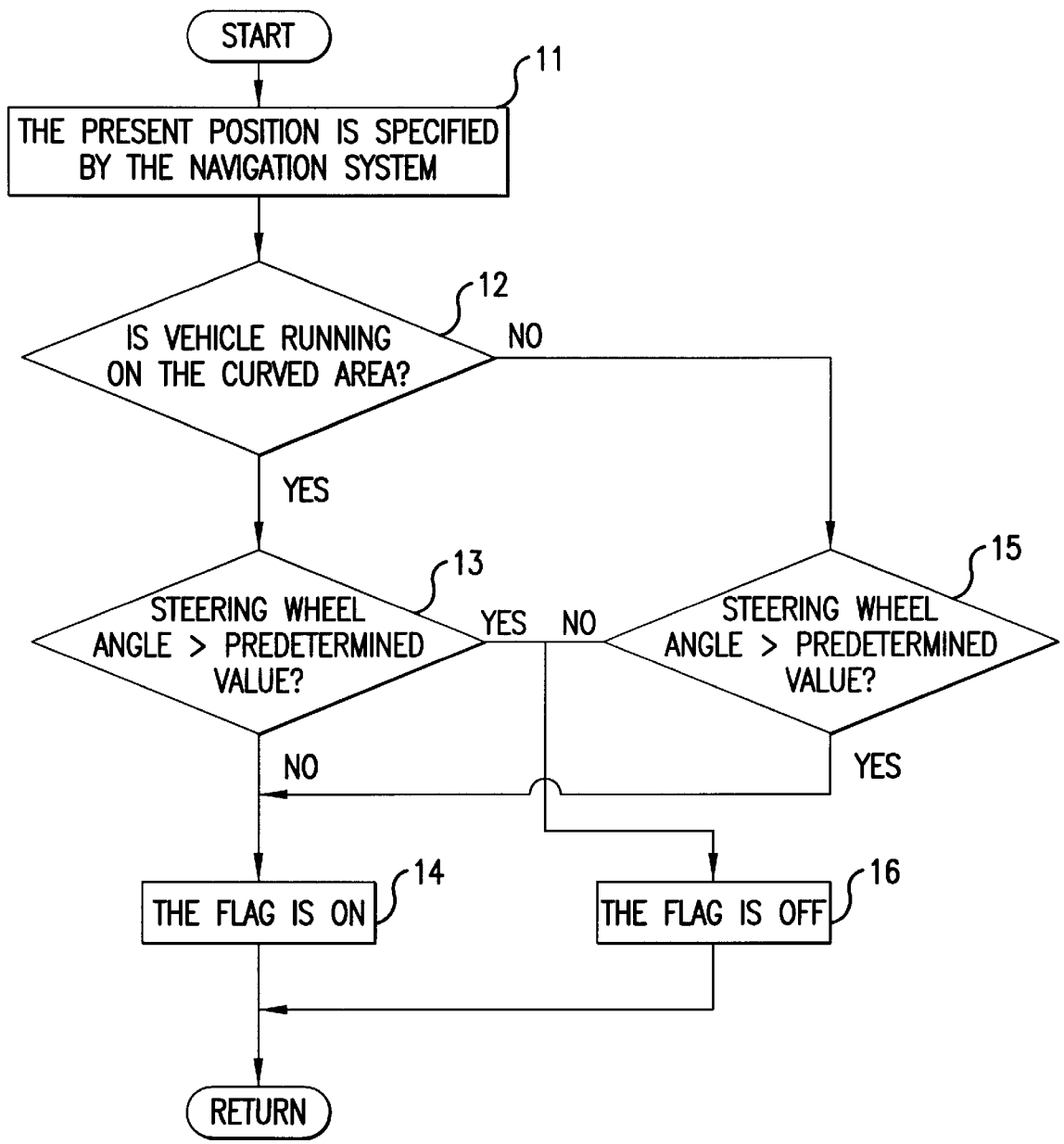
FIG. 8 is a flow chart showing an example of the control to be executed by the control system of the present invention.

Examples of the control flow shown in FIG. 8 judge the accuracy of the route information detected by the second data detecting unit 97 or the map data stored in the recording medium 105 by comparing the location of the present vehicle position, detected by the first data detecting unit 96, and the second data detecting unit 97, or the map data stored in the data recording medium 105.

At Step 11, the same control is executed in Step 1 in FIG. 1. At Step 12, it is decided whether the vehicle be now running in the curved area, such as a, curve, corner, or winding road, based on the information detected by second data detecting unit 97 or the first data detecting unit 96. If the answer of Step 12 is YES, the control flow goes to Step 13. It is decided whether the actual steering wheel angle by the steering sensor 108 exceeds a predetermined value. In other words, if the vehicle is actually running in the curved area, the steering wheel angle inevitably changes. So data detected by the steering sensors 108 are regarded as the standard, and the accuracy of data of the second data detecting unit 97 or the map data in the data recording medium are determined on the basis of the standard data.

If the answer of the Step 13 is NO, the control flow goes to Step 14, i.e., data detected by the steering sensor 108 and data detected by the second data detecting unit 97 or data stored in the data recording medium 105 do not match. At least one of data of the second data detecting unit 97 or stored in the data recording medium does not match data detected by the steering sensor 108. The flag, which indicates that data detected by the second data detecting unit 97 or data stored in the recording medium are inaccurate, is turned ON.

If the answer of Step 12 is NO, the control flow goes to Step 15, when it is decided whether the actual steering wheel angle by the steering sensor 108 exceed a predetermined value. When the answer of Step 15 is YES, even if the vehicle is actually running in the curved area and the steering wheel angle exceeds more the predetermined value, and neither the data from the second data detecting unit 97 nor the map data in the data recording medium does not indicate the curve condition, in such a case, the control flow goes to Step 14. Furthermore, if the answer of Step 15 is NO, data of the steering wheel angle detected by the steering sensor 108 and data of the second data detecting unit 97 or the map data in the data recording medium 105 matches. At Step 16, the flag, which indicates that data detected by the second data detecting unit 97 or data stored in the recording medium are poor, is turned OFF. And the control flow returns. If the answer of Step 13 is YES, it is decided that the vehicle is running on a gentle curved road, and the control flow goes to Step 16. Steps 12, 13, 14, 15, and 16 corresponding to the means for detecting the accuracy of the detection of the information.

The following are other examples which compare data detected by the first data detecting unit 96 and data detected by the second data detecting unit 97 or stored in the recording medium 105, and judge the accuracy of data by the second data detecting unit 97 or data in the recording medium 105. While the vehicle is running a curve, the lateral acceleration surpasses a predetermined value, and the difference of the revolution speed of the right and left wheels surpasses a predetermined value. So, by comparing data detected by the acceleration sensor 117, the wheel revolution at speed sensors 74, and data detected by the second data detecting unit 97 or in the recording medium, it is possible to judge the accuracy of data detected by the second data detecting unit 97 or stored in the recording medium. While the vehicle is running on a rough road , such as, an unpaved road or a bumpy road, data detected by the wheel revolution at speed sensors 74 and the speed sensor 19 are changeable because of the slip of the wheels. So, by comparing data detected by the wheel revolution at sensors 74 or by the vehicle speed sensor 19 and data detected by the second data detecting unit 97 or in the recording medium 105, it is possible to judge the accuracy of data detected by the second data detecting unit 97 or stored in the recording medium.

By comparing data about the width of a road lane or the number of the road lane detected by the laser cruise system 111 and data stored in the recording medium 105, it is possible to judge the accuracy of data stored in the recording medium 105.

By comparing data about the illuminance around the vehicle detected by the illuminance sensor 92 of the lighting system 69 and the map data stored in the recording medium 105, it is possible to judge the accuracy of the entrance and exit of the tunnel of the map data.

Figure 9:
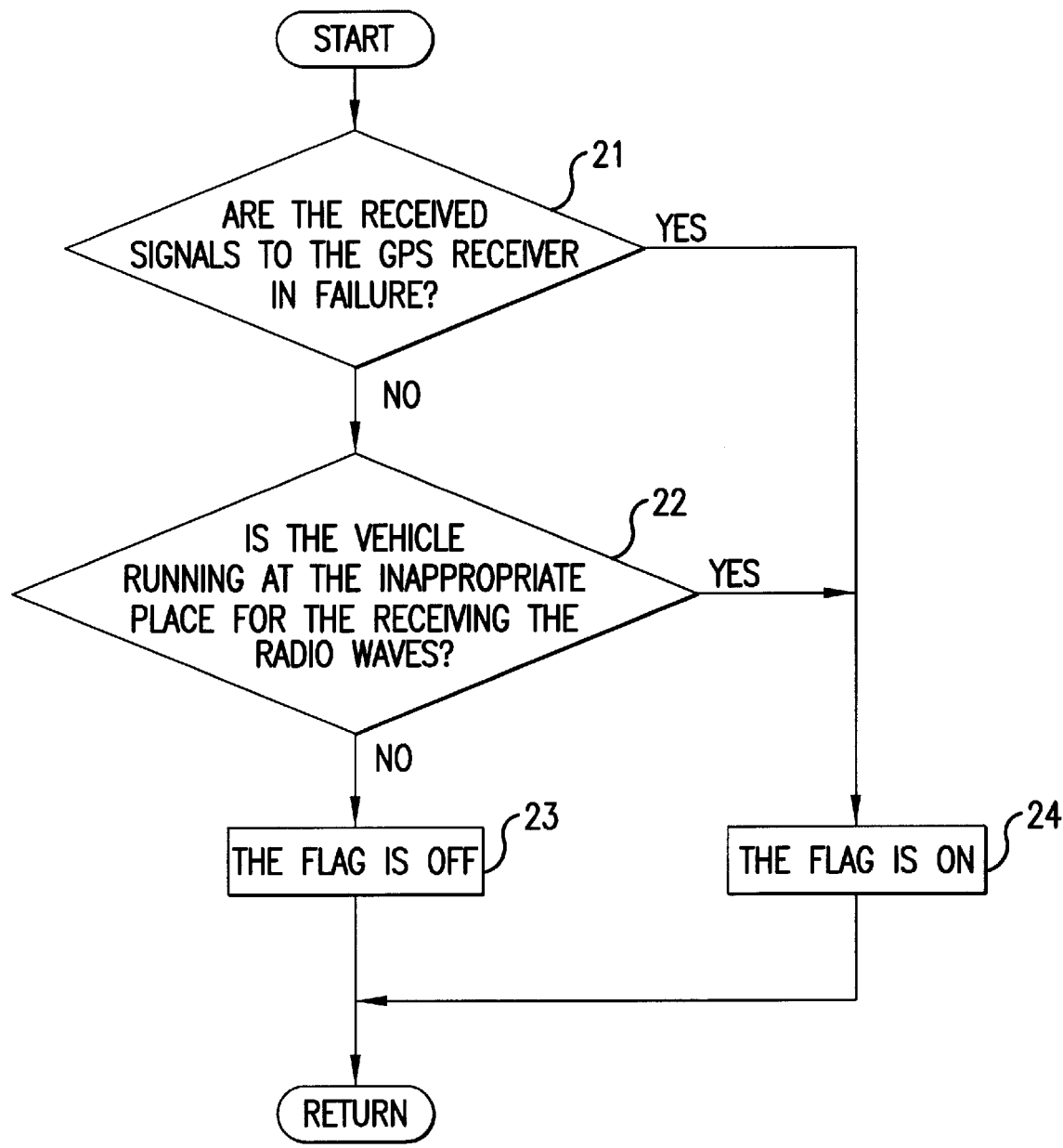
FIG. 9 is a flow chart showing an example of the control to be executed by the control system of the present invention.

Examples of control flows disclosed in FIG. 9 diagnose the accuracy of the route information detected by the second data detecting unit 97 by itself. First of all, at Step 21, the received signals to the GPS receiver 117 determines whether they are in failure. This determination is executed based on the number of man-made satellites which send radio waves received by the receiver, and the receiving condition of the radio waves.

If the answer of the Step 21 is NO, the flow goes to Step 22, the navigation system 70 decides whether the vehicle is running at the inappropriate place for receiving the radio waves, for example, in a tunnel or between high buildings. If the answer of the Step 22 is NO, the control flow goes to Step 23, and the flag, which in the ON state indicates the accuracy of data received by the GPS receiver is bad, is turned OFF and the control flow returns. At Step 21 or 22, the answer is YES, the control flow goes to Step 24, and the flag, which in the ON state indicates the accuracy of data received by the GPS receiver is bad, is turned ON and the control flow returns. Steps 21, 22, 23, and 24 correspond to the means for detecting accuracy of the detection of the information.

Figure 10:
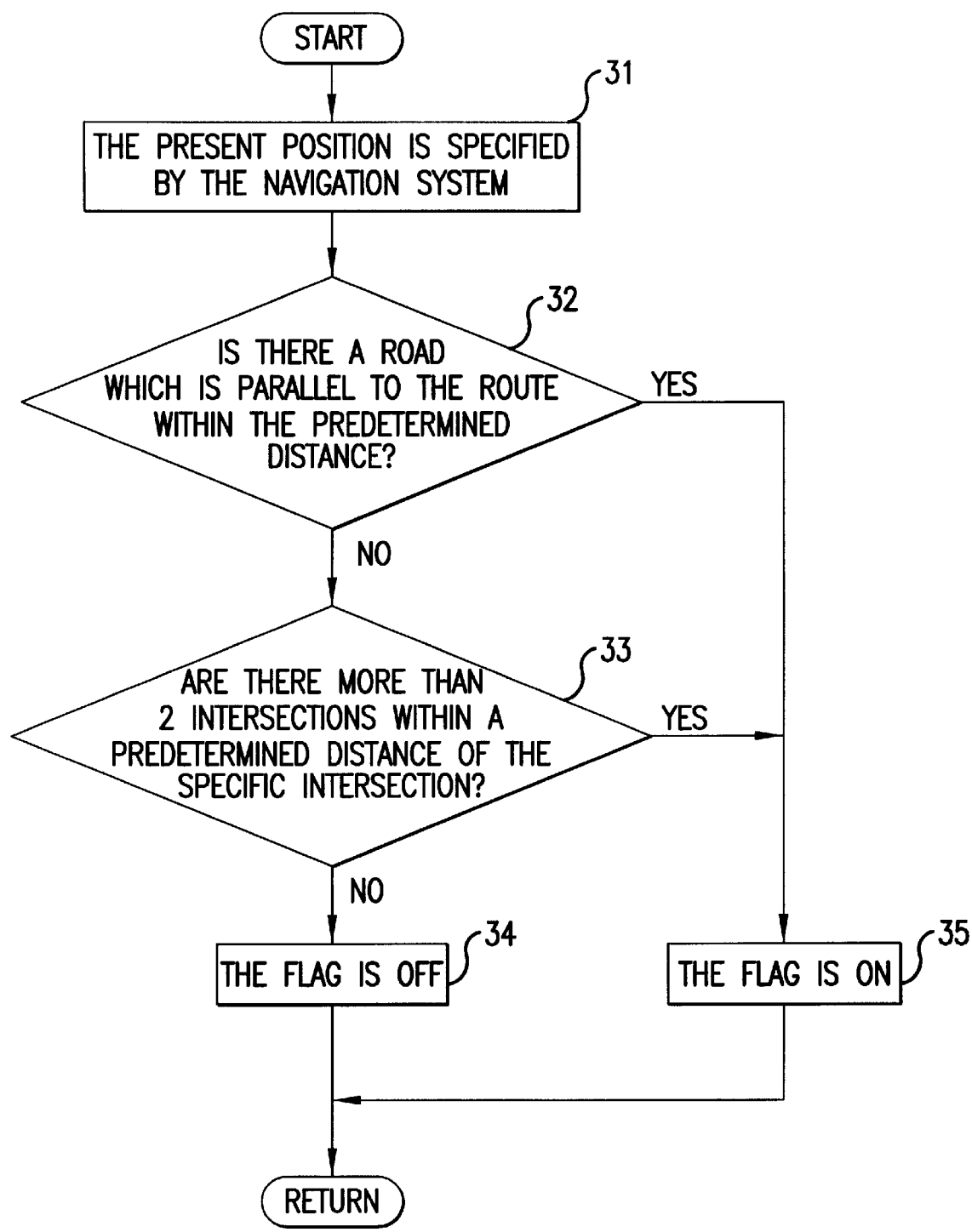
FIG. 10 is a flow chart showing an example of the control to be executed by the control system of the present invention.

Example of control flows disclosed in FIG. 10 judge the possibility of the accuracy of the route information detected by the first data detecting unit 96 and the second data detecting unit 97 on the basis of data stored in the recording medium 105.

At Step 31, the same control is executed in Step 1 in FIG. 1. At Step 32 , it is decided whether there is a road which is parallel to the route within a predetermined distance by data stored in the recording medium 105. If the answer of the Step 32 is NO, the control flow goes to Step 33, because there exists only one route, so, even if the route is judged by the first data detecting unit 96 or the second data detecting unit 97, there is no possibility to incorrectly determine the current road.

At Step 33, it is decided whether there is more than two intersections within a predetermined distance of the specific intersection on the basis of data stored in the recording medium 105. If the answer of the Step 33 is NO, because there is only one intersection within a predetermined distance, when the first data detecting unit 96 or the second data detecting unit 97 recognize the intersection, it is not possible to incorrectly recognize the specific intersection as another intersection. So the flag, which indicates the accuracy of the detection of the first data detecting unit 96 or the second data detecting unit 97, is turned OFF. And the control flow returns. If the answer of the Step 32 is YES, it is a possible to incorrectly distinguish the road and not recognize on which road the vehicle is now, because there is another road that is parallel to the route within a predetermined distance according to data stored in the recording medium 105. So, the control flow goes to Step 35, the flag, which indicates the accuracy of the detection of the first data detecting unit 96 or the second data detecting unit 97, is turned ON. And the control flow returns.

If the answer in Step 33 is YES, when the first data detecting unit 96 or the second data detecting unit 97 recognizes the intersection, it is possible to recognize the specific intersection as another intersections. So, the control flow goes to Step 35. Steps 32, 33, 34, and 35 correspond to the means for detecting accuracy of the detection of the information.

Figure 11:
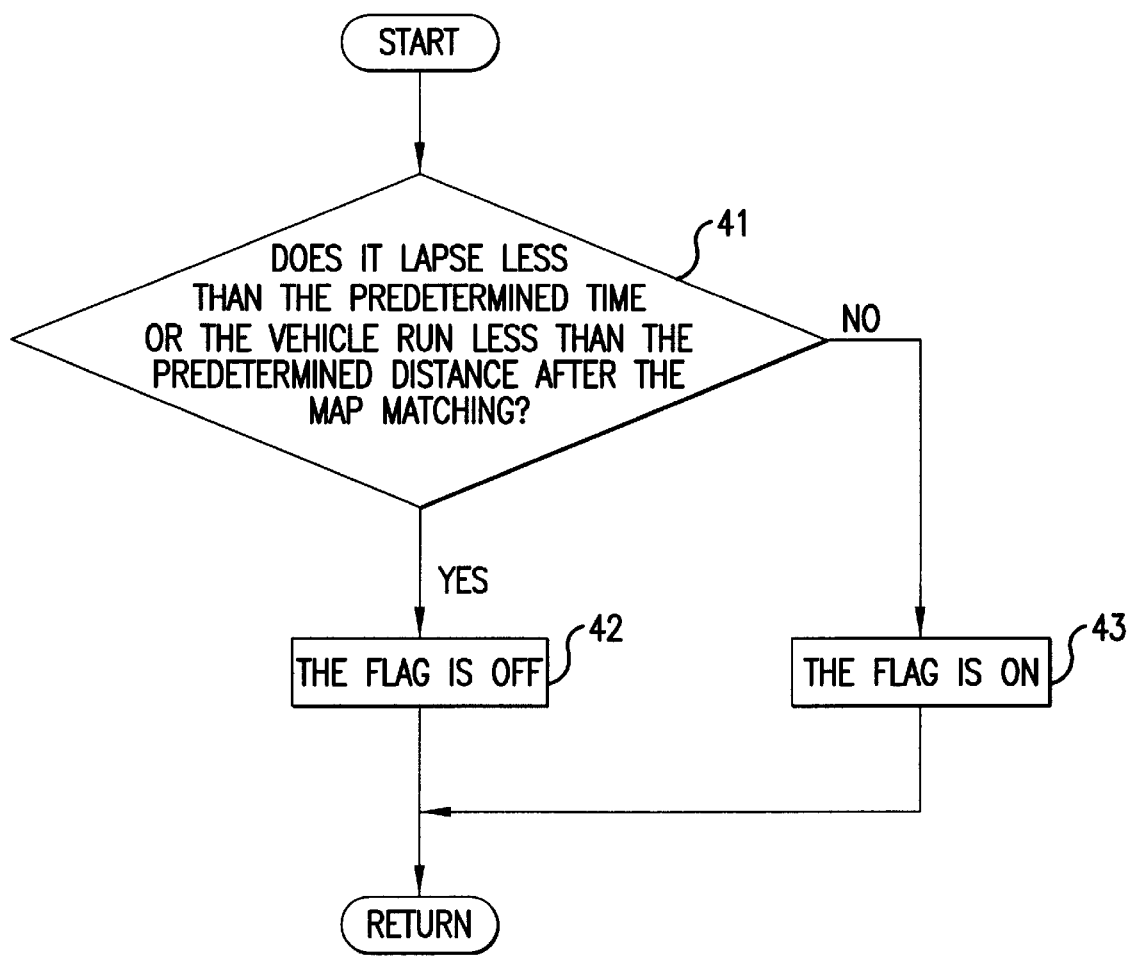
FIG. 11 is a flow chart showing an example of the control to be executed by the control system of the present invention.

Example of control flow disclosed in FIG. 11 judges the accuracy of the route information detected by the condition of the map matching. At Step 41, it is decided whether a time less than a predetermined time has elapsed or the vehicle has run less than a predetermined distance after the map matching. If the answer of Step 41 is YES, the flag, which indicates the accuracy of the detect of the route information, is turned OFF. The correction of the present location of the vehicle is finished by comparing data detected by the first data detecting units 96 and data stored in the recording unit 105. And the control flow returns. If the answer of Step 41 is NO, the control flow goes to Step 43, because it is possible not to finish correcting by comparing data, the flag, which indicates the accuracy of the detect of the route information, is turned ON. And the control flow returns. Steps 41, 42, and 43 correspond to the means for detecting accuracy of the detection of the information. At least one of the examples disclosed in FIG. 7 to FIG. 11 is executed, and the accuracy of the detection of the information detected by the navigation system is determined.

Examples of control flows disclosed in FIGS. 12 to 19 include, the changing controller, in other words, the means for changing the control patterns that are applied to control the behavior control system corresponding to the accuracy of the route information, for example, the flag which indicates the accuracy of the detection of the information is bad condition.

Figure 12:
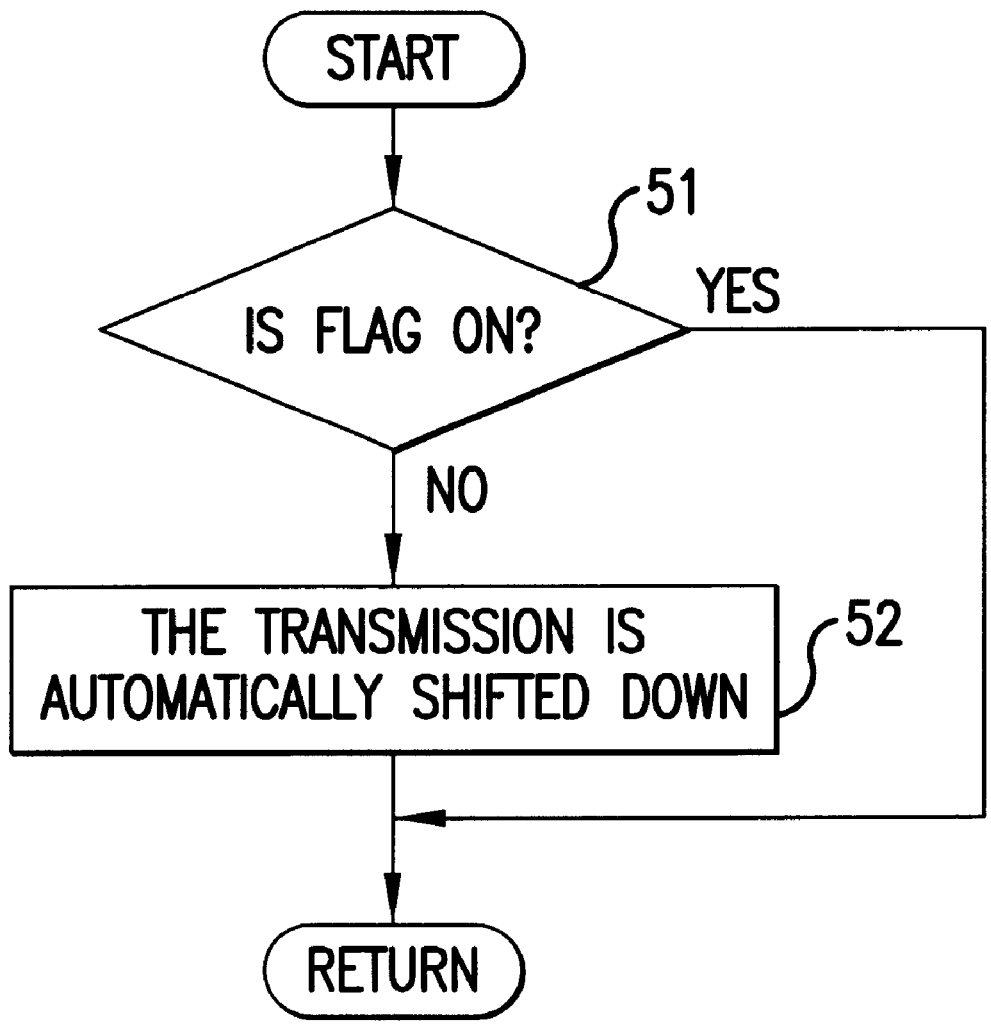
FIG. 12 is a flow chart showing an example of the control to be executed by the control system of the present invention.

Disclosed in FIG. 12 is the control of the automatic transmission 2 by the transmission electronic control unit 55, which basically shifts down when the navigation system 70 detects a corner in front of the vehicle.

At Step 51, it is decided whether the flag, which indicates the accuracy of the detection of the information about a corner detected by the navigation system 70, is turned ON. If the answer of Step 51 is No, the control flow goes to Step 52, because the accuracy of detection of the route information by the navigation system 70 is better than predetermined degree, there is a corner, for example, an intersection where the vehicle will turn right or left. At Step 52 The automatic transmission 2 is automatically shifted down and the control flow returns.

As result, the vehicle speed will be decreased by the engine brake force, and it is possible to go through the corner smoothly. And after the corner, by stepping on the acceleration pedal, the vehicle accelerates sufficiently, and hence, the capability of the power train, the stability and controllability, drivability are improved.

If the answer of the Step 51 is YES, because there is no corner in front of the vehicle, the automatic transmission is not shifted down, and the control flow returns. Step 51 and 62 correspond to the means for detecting the accuracy of the detection of the information.

Figure 13:
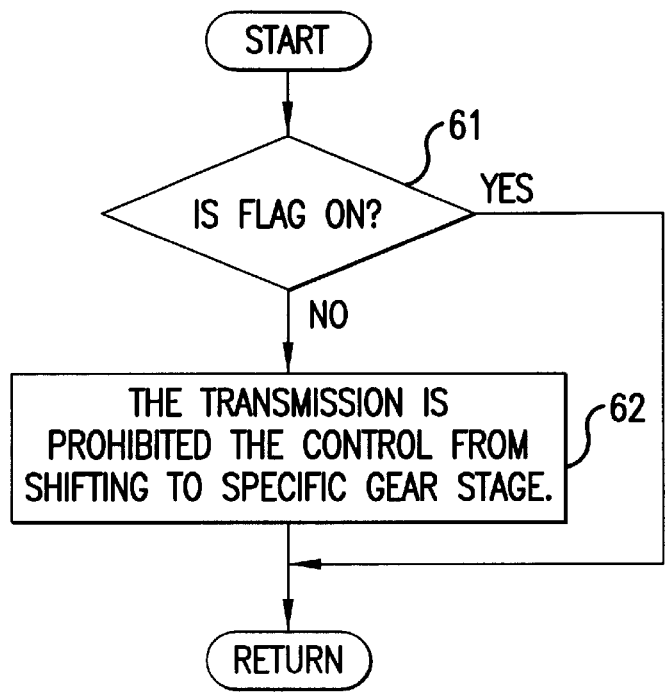
FIG. 13 is a flow chart showing an example of the control to be executed by the control system of the present invention.

Disclosed in FIG. 13 is the other control example which changes the control pattern of the automatic transmission 2. Disclosed in FIG. 12 is the control of the automatic transmission 2 by the transmission electronic control unit 55, which basically prohibits from shifting up when a down slope is detected.

At Step 61, it is decided whether the flag, which indicates the accuracy of the detection of the information about the slope detected by the navigation system 70, is turned ON. If the answer of Step 61 is NO, the control flow goes to Step 62, because the accuracy of detection of the route information by the navigation system 70 is better than a predetermined degree, and there is a down slope in the road. At Step 62 The automatic transmission 2 is prohibited from controlling the shifting to a specific gear stage, in other words, shifting to the gear stage which has a smaller effect on the engine braking, or shifting up, and the control flow returns.

As result, the vehicle will run on the down slope in the road with a controlled speed and with sufficient engine braking. Thus the drivability is improved. And if the answer of Step 61 is YES, there is no down slope in the road, so the control flow returns. Steps 61 and 62 correspond to the changing controller, in other words, the means for which are applied to control the behavior control system corresponding to the accuracy of the route information.

Figure 14:
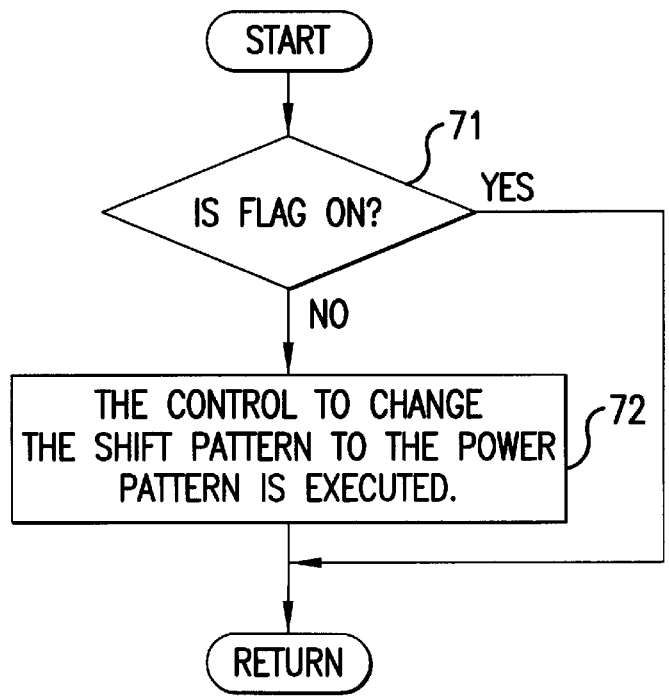
FIG. 14 is a flow chart showing an example of the control to be executed by the control system of the present invention.

Example of control flows disclosed in FIG. 14 is the other control example which changes the control pattern of the automatic transmission 2. Example of control flows disclosed in FIG. 14 is the control of the automatic transmission 2 by transmission electronic control unit 55, which basically changes the shift pattern to the power pattern when the road requires an increase in the driving force, for example, a climbing road. They are detected by the navigation system 70.

Example of control flows disclosed in FIG. 13 is the other control example which changes the control pattern of the automatic transmission 2. Example of control flows disclosed in FIG. 12 is the control of the automatic transmission 2 by transmission electronic control unit 55, which basically prohibits shifting up when a down slope is detected.

At Step 71, it is decided whether the flag, which indicate the bad condition of the accuracy of the detection of the information about the climbing road by the navigation system 70, is turned ON. If the answer of Step 71 is NO, the control flow goes to Step 72, because the accuracy of detection of the route information by the navigation system 70 is better than a predetermined degree, and there is a climbing road. At Step 72, the control to change the shift pattern to the power pattern is executed, and the control flow returns. And if the answer of Step 71 is YES, there is no climbing road, so the control flow returns. Steps 71 and 72 correspond to the changing controller, in other words, the means which are applied to control the behavior control system correspond to the accuracy of the route information.

The other control examples which change the control pattern of the automatic transmission 2 are the following. For example, Step 51 of FIG. 12 is substituted with the following step. It is decided whether the vehicle has reached the end of the congestion. So if the vehicle reaches the end of the congestion, the automatic transmission 2 is shifted to a specific gear stage, in other words, shifting to the gear stage which has more of an effect on the engine braking, shifting down. And another example, Step 52 is substituted with the following step, if the vehicle goes through the curve, the shift is prohibited. And there are other examples, which changes the control patterns of the automatic transmission. One is when the vehicle is stopping in the congestion, then the automatic transmission control system executes the neutral control which is for decreasing fuel consumption. The other one is when the vehicle is running on the freeway or in the suburbs, the automatic transmission control system chooses the economy pattern of the shift diagram. Yet another one is when the vehicle is running on the climbing road or down slope road, the automatic transmission control system prohibits shifting up to the specific gear stage.

Figure 15:
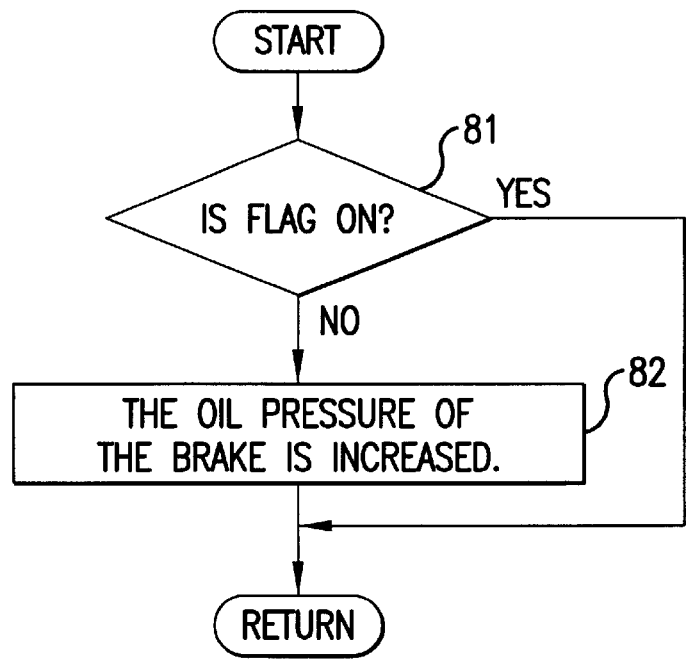
FIG. 15 is a flow chart showing an example of the control to be executed by the control system of the present invention.

Example of control flows disclosed in FIG. 15 includes the changing controller, in other words, the means for changing the control patterns which are applied to the control of the brake system 65 corresponding to the accuracy of the route information detected by the navigation system 70. The control in FIG. 15 is basically when the down slope is detected in front of the vehicle by the navigation system 70, the oil pressure of the wheel cylinders 72 is increased corresponding to the degree of the slope as soon as possible.

At Step 81, it is decided whether the flag, which indicates the accuracy of the detection of the information about down slope road by the navigation system 70, is turned ON. If the answer of Step 81 is NO, the control flow goes to Step 82, because the accuracy of detection of the route information by the navigation system 70 is better than a predetermined degree, and there is a down slope in the road. At Step 82, the oil pressure of the wheel cylinders 72 of the brake system 65 is increased more than the oil pressure which corresponds to the amount of the brake pedal, and the control flow returns. As a result, the braking force of the brake system is controlled as an appropriate value for the degree of the slope. So the drivability is improved. And if the answer of Step 81 is YES, there is no down slope nor the degree of the slope is less than a threshold value, so the control flow returns. Steps 81 and 82 correspond to the changing controller, in other words, the means for changing the control patterns which are applied to control the behavior control system corresponding to the accuracy of the route information and the means for detecting accuracy of the detection of the information.

Figure 16:
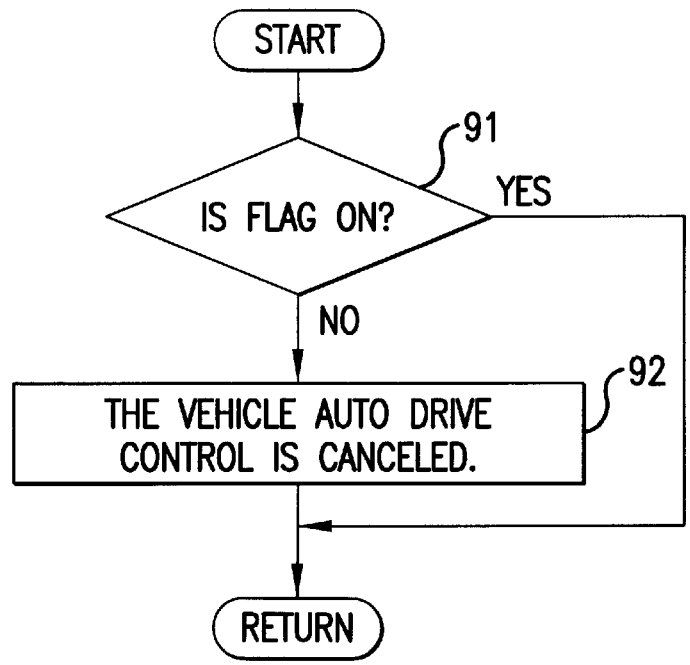
FIG. 16 is a flow chart showing an example of the control to be executed by the control system of the present invention.

The example of control flow disclosed in FIG. 16 includes the changing controller, in other words, the means for changing the control patterns that are applied to the control of the vehicle auto drive control system 66 corresponding to the accuracy of the route information detected by the navigation system 70. The control in FIG. 16 is basically when congestion is detected in front of the vehicle on the freeway by the navigation system 70, the control of the vehicle auto drive control is canceled. In FIG. 16, at Step 91, when the vehicle auto drive control system is set, it is decided whether the flag, which indicates the accuracy of the detection of the information about the congestion on the road by the navigation system 70, is turned ON. If the answer of Step 91 is NO, the control flow goes to Step 92, because the accuracy of detection of the route information by the navigation system 70 is better than a predetermined degree, and there is congestion in front of the vehicle. At Step 92, the vehicle auto drive control is canceled, and the control flow returns. And if the answer of Step 91 is YES, the vehicle auto drive control is continued. Steps 91 and 92 correspond to the changing controller, in other words, the means for changing the control patterns that are applied to control the behavior control system corresponding to the accuracy of the route information.

Figure 17:
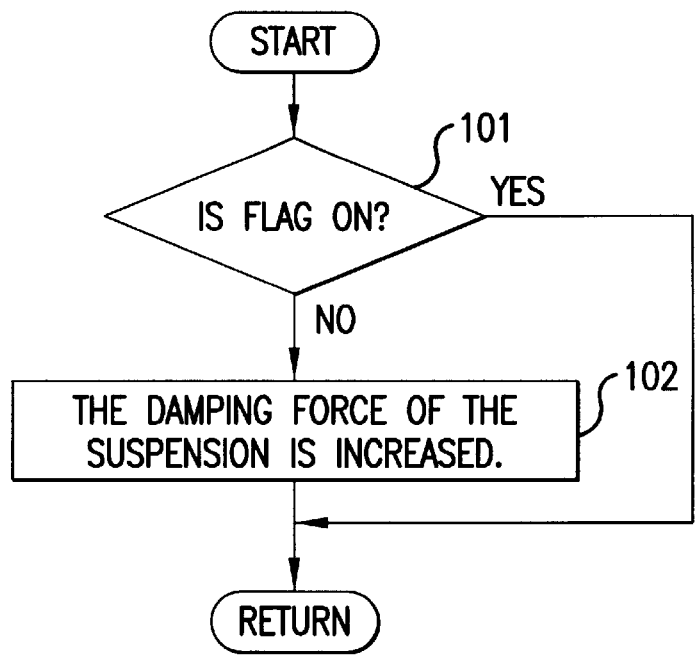
FIG. 17 is a flow chart showing an example of the control to be executed by the control system of the present invention.

The example of control flows disclosed in FIG. 17 includes the changing controller, in other words, the means for changing the control patterns that are applied to control the suspension system 67 corresponding to the accuracy of the route information detected by the navigation system 70. The control in FIG. 17 is basically when unpaved road or rough road is detected in front of the vehicle by the navigation system 70, the damping force of the shock absorbers 79 or air springs 80 is increased, in other words, the suspension system is made hard.

In FIG. 17, at Step 101, when the vehicle auto drive control system is set, it is decided whether the flag, which indicates the accuracy of the detection of the information about a surface of a road by the navigation system 70, is turned ON. If the answer of Step 101 is NO, the control flow goes to Step 102, because the accuracy of detection of the route information by the navigation system 70 is better than a predetermined degree, and there is unpaved or rough road in front of the vehicle. At Step 102, the control increases the damping force of the suspension system 67, and returns. As a result, the vibration of the vehicle is controlled when the vehicle is on unpaved or rough road, and the comfort of the vehicle is improved. If the answer of Step 101 is YES, the control flow returns and the damping force value of the suspension system is kept the same as before. Steps 101 and 102 correspond to the changing controller, in other words, the means for changing the control patterns that are applied to control the behavior control system corresponding to the accuracy of the route information.

Figure 18:
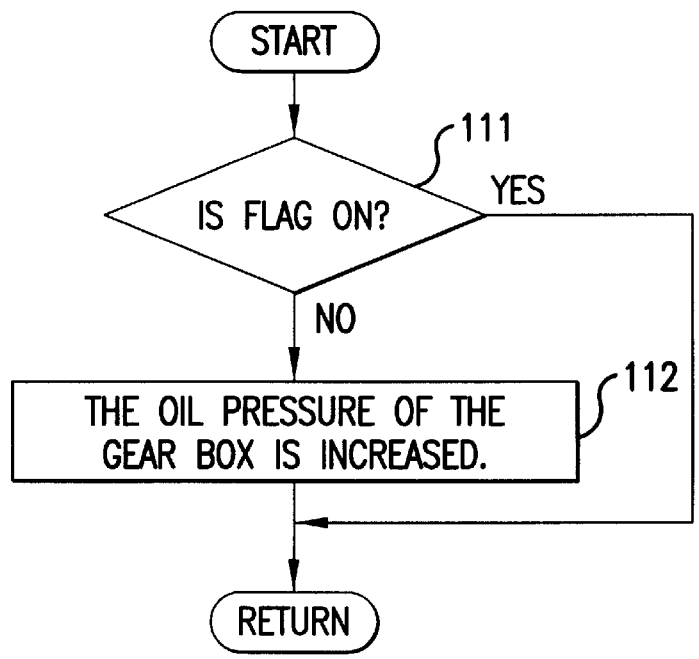
FIG. 18 is a flow chart showing an example of the control to be executed by the control system of the present invention.

The example of control flows disclosed in FIG. 18 includes the changing controller, in other words, the means for changing the control patterns that are applied to the control of the steering system 68 corresponding to the accuracy of the route information detected by the navigation system 70. The control in FIG. 18 is basically when unpaved or rough road is detected in front of the vehicle by the navigation system 70, the oil pressure of the gear box 85 of the steering system 68 is increased.

In FIG. 18, at Step 111, it is decided whether the flag, which indicates the accuracy of the detection of the information about congestion on the road by the navigation system 70, is turned ON. If the answer of Step 111 is NO, the control flow goes to Step 112, because the accuracy of detection of the route information by the navigation system 70 is better than a predetermined degree, and there is unpaved or rough road in front of the vehicle. At Step 112, the control increases the oil pressure of the gear box 85 of the steering system 68, and the control flow returns. As a result, by only giving a small force to the steering wheel 83, the stability of the operating direction is achieved. The stability, the controllability and the drivability are thus improved.

If the answer of Step 111 is YES, the control flow returns because the route is comparatively smooth. Steps 111 and 112 correspond to the changing controller, in other words, means for changing the control patterns that are applied to control the behavior control system corresponding to the accuracy of the route information.

Figure 19:
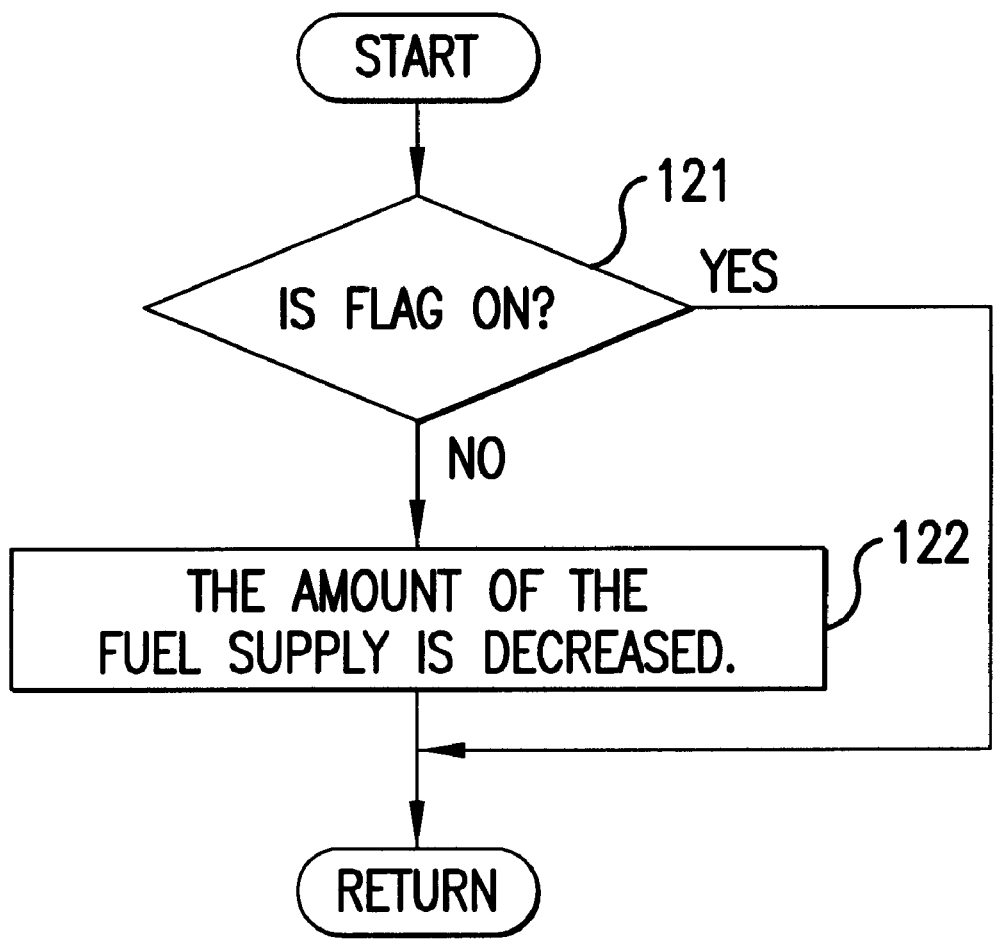
FIG. 19 is a flow chart showing an example of the control to be executed by the control system of the present invention.

The example of control flows disclosed in FIG. 19 includes the changing controller, in other words, the means for changing the control patterns that are applied to the control of the engine power corresponding to the accuracy of the route information detected by the navigation system 70. The control in FIG. 19 is basically when congestion is detected in front of the vehicle by the navigation system 70, the fuel injection control system decreases the amount of the fuel injection.

In FIG. 19, at Step 121, it is decided whether the flag, which indicates the accuracy of the detection of the information about congestion on the road by the navigation system 70, is turned ON. If the answer of Step 121 is NO, the control flow goes to Step 122, because the accuracy of detection of the route information by the navigation system 70 is better than predetermined degree, and the vehicle is in congestion. At Step 122, the electronic throttle valve is shut irrespective of the amount of the acceleration pedal operation, and the amount of the fuel supply is decreased, and the control flow returns. As a result, overheating of the catalyst is prevented and the saving of the fuel is executed.

If the answer of Step 121 is YES, the control flow returns because there is no possibility for the vehicle to enter congestion. Steps 121 and 122 correspond to the changing controller, in other words, the means for changing the control patterns that are applied to the control of the behavior control system corresponding to the accuracy of the route information and to the means for detecting accuracy of the detection of the information.

It is possible to combine at least one of the control examples from FIG. 7 to FIG. 11 and at least one of the control examples from FIG. 12 to FIG. 19.

As above disclosed, the control device for a vehicle, which controls behavior of the vehicle based on the information regarding the route which the vehicle will follow, judges the accuracy of the route information by the accuracy detect means mentioned in FIG. 7 to FIG. 11, and the control patterns are changed, by the means for the control patterns mentioned in FIG. 12 to FIG. 19, corresponding to the accuracy of the route information.

So when the accuracy of the detection of the information about the route detected by the navigation system 70 is bad, which does not reflect the actual conditions, the behavior control of the vehicle, which corresponds to the incorrectly detected information, is not executed. As a result it is possible to adapt the behavior control for the vehicle to the actual road condition appropriately. And the capability of the power train, the stability and controllability, drivability are thereby improved.

In this invention, the changing controller, in other words, the means for changing the control patterns that are applied to control the behavior control system corresponding to the accuracy of the route information, includes the function which prohibits the application of the control patterns corresponding to the road condition, includes the function which changes the degree of the control corresponding to the degree of the accuracy of the road condition, and changes one control pattern to the other control pattern.

In the control that has the function of changing the degree of the control corresponding to the degree of the accuracy of the road condition, the accuracy of the detection of the information is classified and the multiple standards are predetermined corresponding to the multiple classifications of the information, and the different control which has different contents are executed. For example, the shift control of the automatic transmission has several threshold values which are used to determine when to shift, and these values correspond to the degree of the accuracy of the detection of the information. In this invention, the changing controller, in other words, the means for changing the control patterns that are applied to the control of the behavior control system, includes the function which corrects the standard control pattern by calculation and uses multiple control patterns that are predetermined. In this invention, it is possible to use the electronic motor as a drive force resource, to use continuously variable transmission (CVT) as a automatic transmission, and to use the manual transmission in stead of the automatic transmission.

In this specification, the behavior control system includes the engine 1, the automatic transmission 2, the servo motors 4, the electronic throttle valve 5, the fuel injection control system 6, the ignition timing adjusting unit 7, the hydraulic control device 54, the brake system 65, the vehicle auto drive control system 66, the suspension system 67, and the steering system 68. The route information detector includes the navigation system 70. The control system for the vehicle can control at least one of the behavior control systems on the basis of the route information by the navigation system. The control pattern of the behavior control system includes the following patterns.

When the vehicle goes through a curvy and winding road, the automatic transmission 2 is shifted down to reduce the vehicle speed by using the engine brake. When the vehicle starts on the road which has low frictional coefficient, the automatic transmission is set at the second gear stage in order to control the slip of the wheels. It is possible to prohibit a shifting down to smaller than the specific gear stages in order to control the slip of the wheels when the vehicle runs on a road which has a low frictional coefficient. It is possible to prohibit from shifting when the vehicle runs on a curve. It is possible to shift down when the vehicle reaches the end of a congestion, the automatic transmission 2 is shifted to a specific gear stage, in other words, shifting to the gear stage which has a larger effect on the engine braking, i.e., shifting down.

At the brake system 65, when the vehicle runs on the road which has low frictional coefficient, it is possible to control the oil pressure of the wheel cylinders 72 in order to prevent the wheels from slipping during braking. When the vehicle runs on a slope down, it is possible to control the oil pressure of the wheel cylinders 72 in order to increase the braking force.

At the vehicle auto drive control system 66, when the vehicle runs on the freeway, it is possible to set vehicle speed automatically and start to control, and it also is possible to cancel the control of the vehicle auto drive control.

At the suspension system 67, when a vehicle runs on an unpaved road, it is possible to increase the damping force of the shock absorbers 79 or the air springs 80 in order to control the vibration of the vehicle. When a vehicle runs at the transition from a straight road to a curve, it is possible to increase the damping force of the rear wheels. When the vehicle is rounding a corner, it is possible to increase the damping force in order to achieve an under steering condition. These controls improve the stability and controllability, drivability, and comfort.

At the steering system 68, when the vehicle runs on an unpaved road or a rough road, it is possible to increase the oil pressure to the gear box 85 in order to decrease the operating force of the steering wheel 83 and to improve the stability of the direction.

At the engine 1, when a vehicle enters congestion, the electronic throttle valve is shut irrespective of the amount of the acceleration pedal operation, and the amount of the fuel supply is decreased in order to prevent overheating of the catalyst and save fuel.

There is a condition which the route information is different from the actual driving condition. In other words, there is a possibility that the accuracy of the detection of the information becomes bad, a failure occurs, and the error is made. The reasons of these phenomena are following, it is impossible to receive the radio waves because the radio wave are blocked by obstacles, each element of the first data detecting unit 96 has errors, or the various sensors have errors because of slips of the wheels and so on.

If conditions of the route information are different from the actual driving conditions, which happens when the vehicle runs on a Y shape road, when the vehicle runs on a hairpin curve, when the vehicle runs between high buildings, when the vehicle is on a turntable, when the vehicle runs in a tunnel, when the vehicle runs under an elevated track, when the vehicle uses non-standardized tires, when the vehicle runs on a road which does not exist on a map, and the vehicle is carried by a ferry. And furthermore, various kinds of the road constructions, the expansion of reclaimed land, and a tunnel which is newly opened causes a difference between the actual road condition and the map data stored in the recording medium 105. So when the accuracy of the route information is low, the behavior control system is controlled by the control patterns on the basis of the route information, and the correspondence of the road condition and the vehicle behavior will be lacking. As a result, the stability and controllability, drivability, and comfort are bad. So this invention has a control pattern changing means for changing the control pattern corresponding to the accuracy of the route information of the navigation system 70.

The followings are examples, which are applicable to at least one embodiment which are explained FIG. 7 to FIG. 19.

Figure 20:
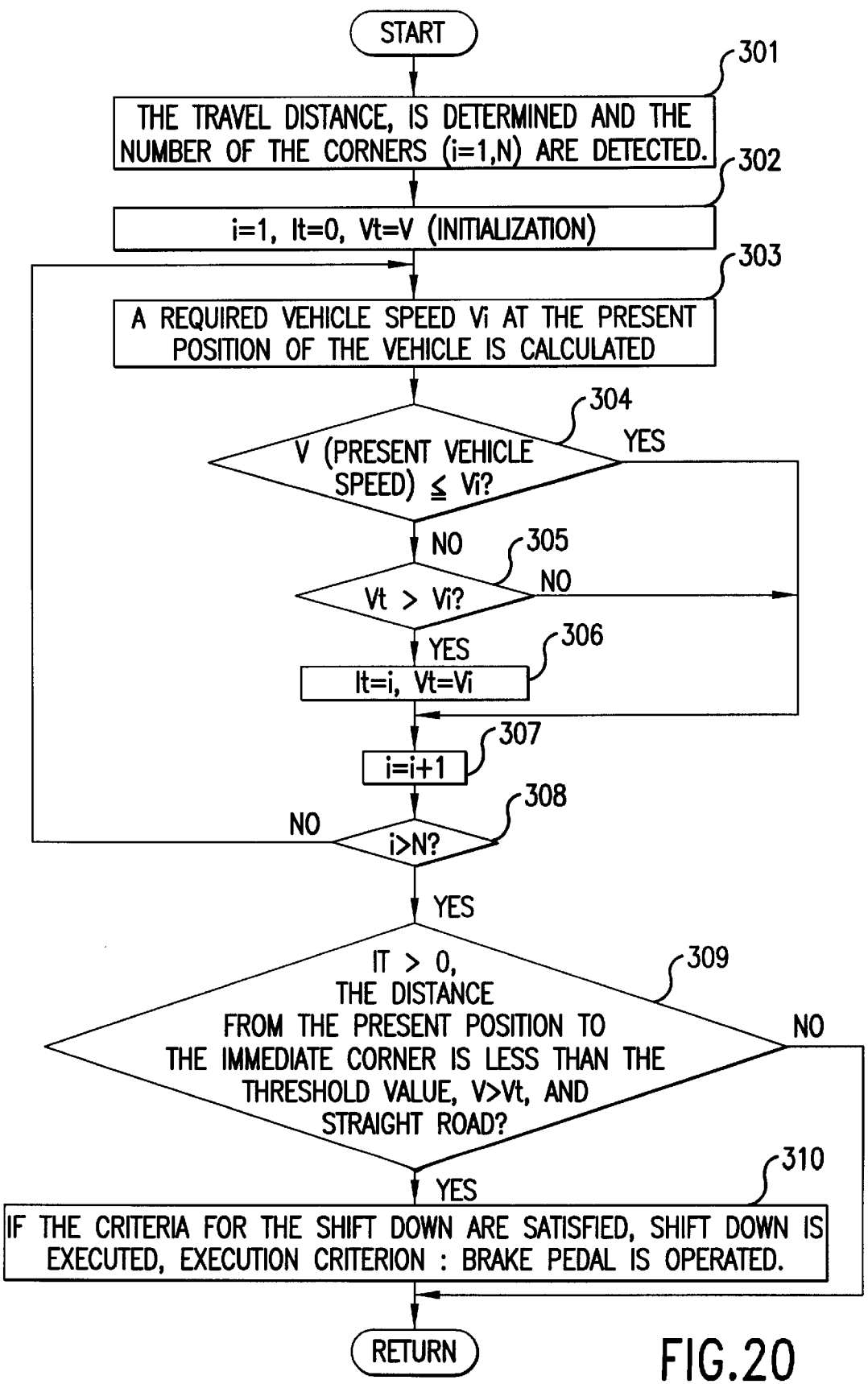
FIG. 20 is a flow chart showing an example of the control to be executed by the control system of the present invention.

FIG. 20 shows an example of the control flow.

In FIG. 20, the navigation system 70 or the transmission control unit 55 detects not only an immediate vehicle speed decreasing point, at which it is necessary to decrease the speed of the vehicle, but also the vehicle speed decreasing point within the predetermined distance place. And it determines whether the decrease in the speed needs to be more than the threshold or not at each place. And this determination is used for the control of the automatic transmission 2.

First of all, the driver's operation for the setting of the destination and the indication of the map of the operating route is executed by using the switches 107 of the multiple audio visual system 99. The present position of the vehicle and the road ahead of the present position can be specified by data of the first data detecting unit 96 and the second data detecting unit 97.

At Step 301, the traveling distance is determined if the vehicle decreases its speed from the present speed to zero the vehicle using the target deceleration, and the number of the corners i (i=1, N), which are regarded as vehicle speed decreasing points at which it is necessary to decrease in speed, are detected in the determined traveling distance. The control of the Step 301 will be explained specifically in the example described in FIG. 21 and FIG. 22.

At Step 302, at first, the number of the corners i, a target corner It, and a vehicle target speed Vt are initialized, so these are set as i=1, It=0, and Vt=the present speed of the vehicle. The target corner It indicates a corner where a shift down is needed if the vehicle decreases in speed from the present. In other words, if the vehicle is to go through the corner smoothly, it must decrease its speed by more than the target deceleration. The vehicle target speed Vt is set for maintaining proper handling of the vehicle, stability of the operation, and good drivability if the vehicle rounds the corner.

The vehicle target speed Vt is calculated for each corner (i=N). The number of the corners (i=N) is detected at Step 301. The vehicle target speed Vt is the appropriate speed for maintaining proper handling of the vehicle, stability of the operation, and good drivability as the vehicle rounds each corner, and it is calculated based on the radius of the corner and so on.

At Step 303, a required vehicle speed Vi at the present position of the vehicle is calculated in order to make the present vehicle speed V decrease to the vehicle target speed Vt for the specific corner. Vi is calculated on the basis of the distance between the present position of the vehicle and each corner. In other words, Vt is determined to pass through the i-th corner safely, and Vi is determined as how much speed the vehicle has to decrease at present. Vi is calculated on the basis of the distance between the present position and the i-th corner. Step 303 will be described in detail FIG. 23. At 304, it is decided whether the present vehicle speed is more than the required vehicle speed Vi or not. In other words, Step 304 judges whether it is possible for the vehicle to decrease the present speed to less than the vehicle target speed Vt when it enters the i-th corner, and if the vehicle decreases its speed by less than the vehicle target deceleration.

If the answer of Step 304 is NO, the control flow goes to Step 305. At Step 305, it is decided whether the required vehicle speed Vi corresponding to N corners is lower than the vehicle target speed. If the answer of the Step 304 is YES, the control flow goes to 306. At Step 306, the i-th corner is counted as a target corner It, and the vehicle target speed Vt is renewed to the minimum value of the required vehicle speed Vi.

At Step 307, the number of the corner i is increased by 1, which means one of the calculations of the vehicle target speed Vt corresponding to one of the corners is finished. At 308, it is decided whether the number of the corner i exceeds the number of the corner N, which is detected in Step 301. If the answer of Step 308 is NO, the control flow goes back to Step 303. The loop is constructed by Steps 302, 307, and 308, and the loop counter i is the number of corners, which is detected by Step 301.

If the answer of Step 304 is YES, the control flow goes to Step 307, because there is a possibility to enter the corner at less than the vehicle target speed Vt, even if the vehicle keeps the present vehicle speed V. If the answer of Step 30305 is NO, the control flow goes to Step 307.

As shown in FIG. 20, if the answers of Step 304 is NO and Step 305 is YES, the i-th corner is counted as the target corner It. In other words, if the target deceleration from the present speed V to the required vehicle speed Vi of the specific corner is larger than the threshold value, the specific corner is regarded as the target corner It, and it is counted as the target corner It.

If the answer of the Step 308 is YES, it means that the all of the calculations about the vehicle target speed Vt, corresponding to the all the corners N, which are detected in Step 301, are finished. At Step 309, it is decided whether the target corner It is more than 0. If It is more than 0, it means that there is more than one corner where vehicle is not able to decrease its speed to the vehicle target speed Vt at the rate less than the target deceleration. And it is decided whether the distance from the present position to the immediate corner is less than the threshold value. And it is decided whether the present vehicle speed V is more than the vehicle target speed Vt, in other words, the present vehicle speed V is more than the minimum value of the required vehicle speed Vi. And it is decided whether the vehicle is on the straight road.

At Step 309, if the all criteria are satisfied, the control flow goes to Step 310. In other words, if there exists more than one target corner It and the corner is located on a straight road within the threshold distance from the present position, the control flow goes to Step 310. Because there exists It, there is little possibility to accelerate before entering the target corner, and the reduction of the vehicle speed or the shift down has little influence on the vehicle, stability of the vehicle, and the drivability.

At Step 310, if the criteria for the shift down of the automatic transmission 2 are satisfied, more than one gear stage of the shift down will be executed and the control flow returns. The criteria for the shift down include following condition, when the amount of the operation of the brake pedal 21 is detected, or when the amount of the operation of the acceleration pedal 8 is detected. The number of the shift at the same time is determined on the basis of the deceleration which is needed.

At Step 309, if the criteria are not satisfied, the shift down is not executed and the control flow returns. Because of the reduction of the vehicle speed, the shift down influences the behavior of the vehicle, stability of the vehicle, and the drivability.

According to the control flow shown in FIG. 20, when the corner is detected on the road ahead of the present position by the navigation system, the gear stage is only shifted down if the deceleration from the present vehicle speed to the required vehicle speed Vi is more than the threshold value. The shift down of the gear stage is used to get the engine to brake easily. So it is possible that when the criteria are satisfied, the control will be executed to get the engine brake effect.

In other words, if the deceleration is smaller than the threshold value, the shift down is prohibited. It is possible to decrease the number of the shift down of the automatic transmission 2 as small as possible. Comfort and drivability of the vehicle will be improved because the shift down of the automatic transmission 2 is controlled. As shown in FIG. 20, because the shift down of the automatic transmission 2 is controlled by taking account into the corners, the shift down is prohibited during the corner, and the shift shock during the corner is controlled, and the handling of the vehicle is stable and stability of the operation is improved.

Figure 21:
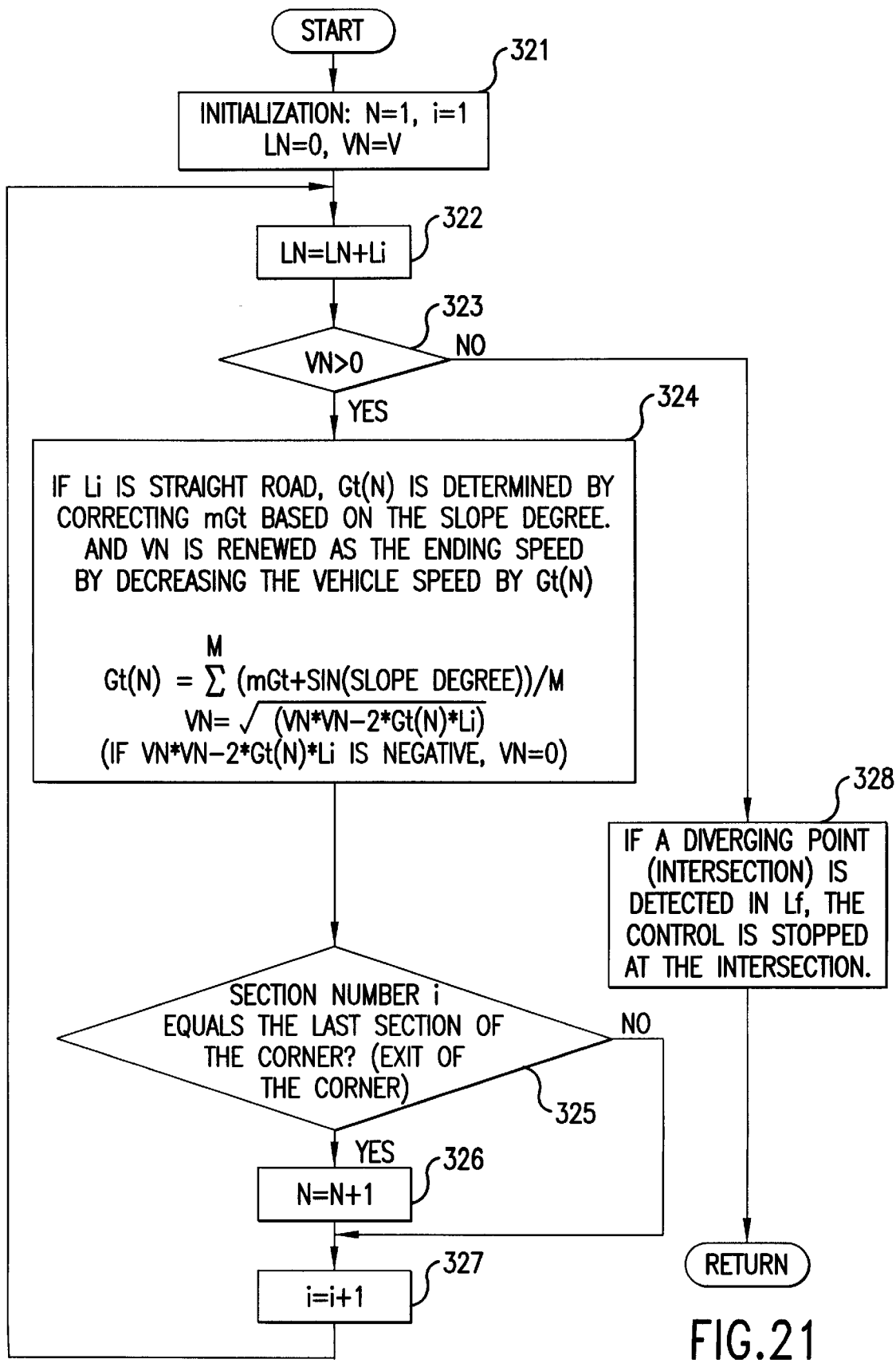
FIG. 21 is a flow chart showing an embodiment of the control to be executed at Step 301 of FIG. 20.

A control flow shown in FIG. 21, which is one of the examples, describes the embodiment in the Step 301 of the flow in FIG. 20. FIG. 21 shows the control flow which detects the corners on the road ahead of the present position during the present vehicle speed decrease to zero by the target deceleration, which corresponds to the present speed.

At Step 321, initializations are executed as N=1, i=1, LN=0, VN=V. N indicates the number of the corners. i indicates the section number which corresponds to links 88 of the map data which are stored in the data recording medium 105. LN indicates the distance between the present position at the N-th corner. VN indicates the vehicle speed at N-th corner if the present vehicle speed decreases by the target deceleration. At Step 322, the distance, between the present position of the vehicle and the N-th corner, is calculated by adding the distance Li of the section i to the initialized distance LN=0. At Step 323, it is decided whether the vehicle speed VN is more than 0 or not. The above decision is for executing the following control when the vehicle goes through the corners until it stops.

If the answer of Step 323 is YES, the control flow goes to Step 324. The target deceleration Gt (N) for each corner and the vehicle speed are calculated by using formula 1 and formula 2.

$$Gt(N) = \sum^{M} (mGt + \sin(\text{slope degree}))/M \quad \text{(formula 1)}$$

$$VN = \sqrt{\ } (VN*VN - 2*Gt(N)*Li) \quad \text{(formula 2)}$$

The target speed decreasing rate Gt (N) is calculated by using formula 1. mGt is a one of data from the map which stores the mGt corresponding to the vehicle speed VN. mGt is corrected by the road slope which is stored in the recording medium 105. M is the number of data points of the slope degree. VN is renewed by using formula 2. If the vehicle runs at VN at the beginning and it runs Li distance, VN is renewed as the ending speed by decreasing the vehicle speed at the target deceleration. If the result of the (VN*VN−2*Gt (N*)Li) is less than 0, VN=0 is set. On a straight road to the next corner, it is possible to determine the slope data by using the actual information of the vehicle, not using data from the data recording medium. In detail, it is calculated by comparing a standard acceleration value which is stored in the engine electronic control unit (E-ECU) 10 and the actual acceleration value which is calculated from information from the vehicle speed sensor 19.

At Step 325, it is decided whether the section number i be a last section which includes the corner. In other words, it is decided whether the vehicle is to exit the corner. If the answer of Step 325 is YES, the control flow goes to Step 326, and 1 is added to the initialized N which is the number of the corner.

At Step 327, 1 is added to the initialized i which is the number of the section number i, and the control flow returns to the Step 322. IF the answer of the Step 325 is NO, the control flow goes to Step 327. This prevents from counting the same corner repeatedly.

If the answer of Step 323 is NO, the control flow goes to Step 328. Detection for all of the corners, which exist between the present position and where the vehicle stops, are finished. At Step 328, if a diverging point, such as an intersection, is detected between the present point and the distance of Lf by the navigation system 70, it is impossible to predict which way the driver will choose. So control of the detecting the corners stopped and the control flow returns. The loop is constructed by Steps 321, 323, and 327, and the loop counter is i.

Figure 22:
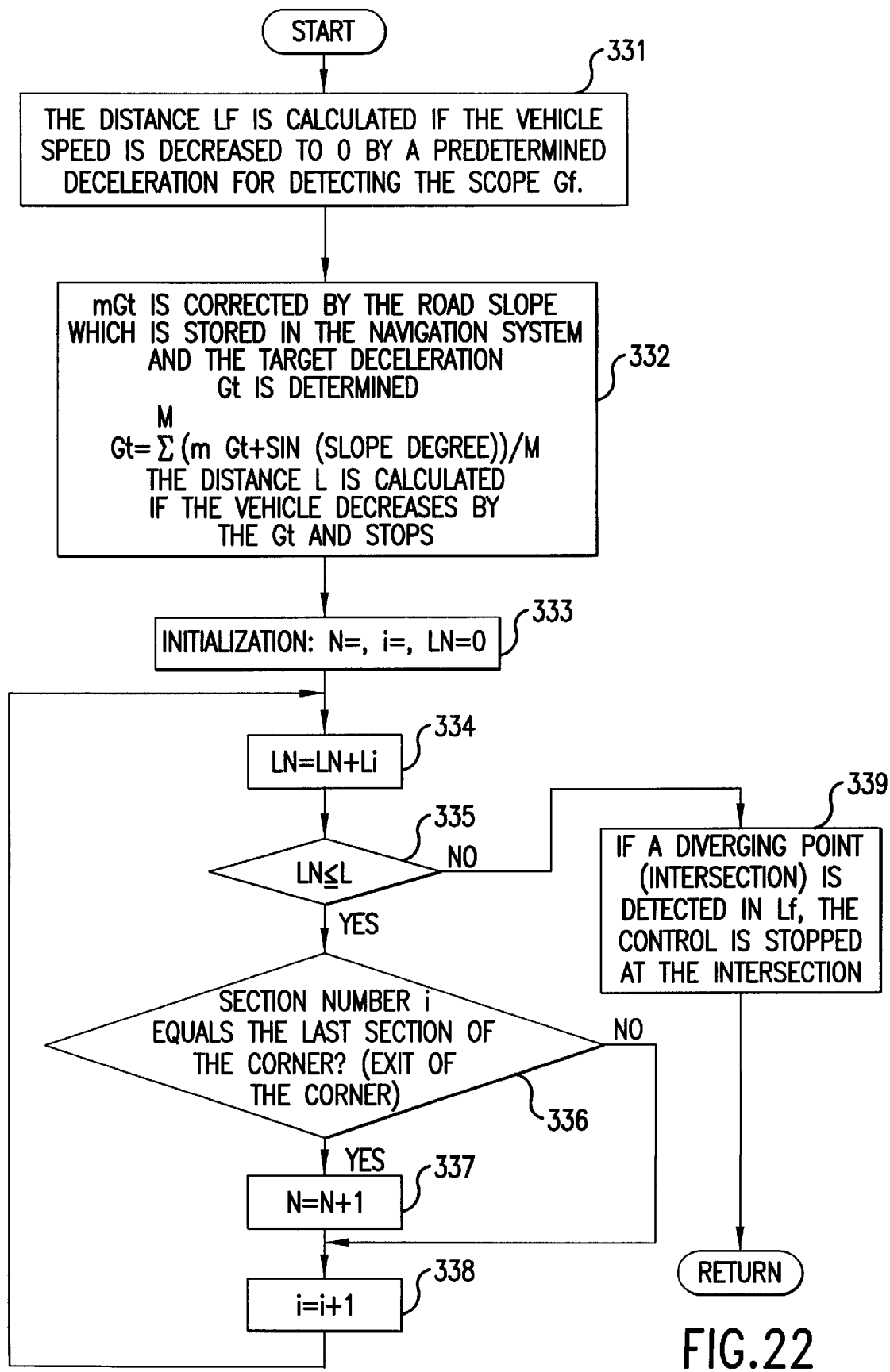
FIG. 22 is a flow chart showing an embodiment of the control to be executed at Step 301 of FIG. 20.

The control flow shown in FIG. 22, which is another example, describes the embodiment of Step 301 of the flow in FIG. 20. FIG. 22 shows the control flow which detects the corners on the road ahead of the present position during the present vehicle speed decrease to zero by a predetermined deceleration from the present vehicle speed.

At Step 331, the distance Lf is calculated if the present vehicle speed is decreased to 0 by a predetermined deceleration for a detecting area.

$$Lf = V*V/(2*Gf)$$

At this formula, V indicates the present vehicle speed, Gf indicates the predetermined deceleration for the detecting area. Gf is determined so the vehicle is able to smoothly stop if the vehicle decreases from the present vehicle speed. Gf is determined as a provisional value, and it is set as 0<Gf<Gt. Gt indicates the minimum value of the target deceleration for the present vehicle speed.

As a standard value is determined by the map which stores the target deceleration corresponding to the present vehicle speed mGt. mGt is corrected by the road slope which is stored in the recording medium 105 and the target deceleration Gt is determined. This calculation is executed by a formula 3.

$$Gt = \sum^{M} (mGt + \sin(\text{slope degree}))/M \quad \text{(formula 3)}$$

In the formula 3, Gt indicates the target deceleration. mGt indicates the target deceleration corresponding to the present vehicle speed determined by the map. M is a number of data point of the slope degree. At Step 323, the distance L is calculated if the present vehicle speed is decreased to 0 by the target deceleration Gt for detecting area.

$$L = V*V/(2* Gt)$$

The distance L is the standard for the detecting the corners ahead of the present position.

At Step 333, initializations are executed as N=1, i=1, LN=0. N indicates the number of the corners. i indicates the section number which corresponds to links 88 of the map data which are stored in the data recording medium 105. LN indicates the distance between the present position and the N-th corner.

At Step 335, it is decided whether the distance between the present position and the N-th corner is smaller than the standard distance for detecting corners L. At Step 335, the answer is YES, the control flow goes to Step 336 and it is decided whether the section number i is a last section which consists of the corner. In other words, it is decided whether the detected section shows the exit of the corner.

If the answer of the Step 336 is YES, the control flow goes to Step 337, 1 is added to the number of the N which is initialized, 1 is added to the initialized i which is the number of the section number i, and the control flow returns to the Step 334. If the answer of the Step 336 is NO, the control flow goes to Step 338. Step 336 and Step 337 are executed because they prevent from counting the same corner repeatedly.

If the Answer of Step 335 is NO, the control flow goes to Step 339. Detection for all of the corners, which exist between the present position and the distance L, is finished. At Step 339, the same control as the Step 328 of FIG. 21 is executed and the control flow returns. The loop is constructed by Step 333, Step 335 and Step 338, and the loop counter is i.

Figure 23:
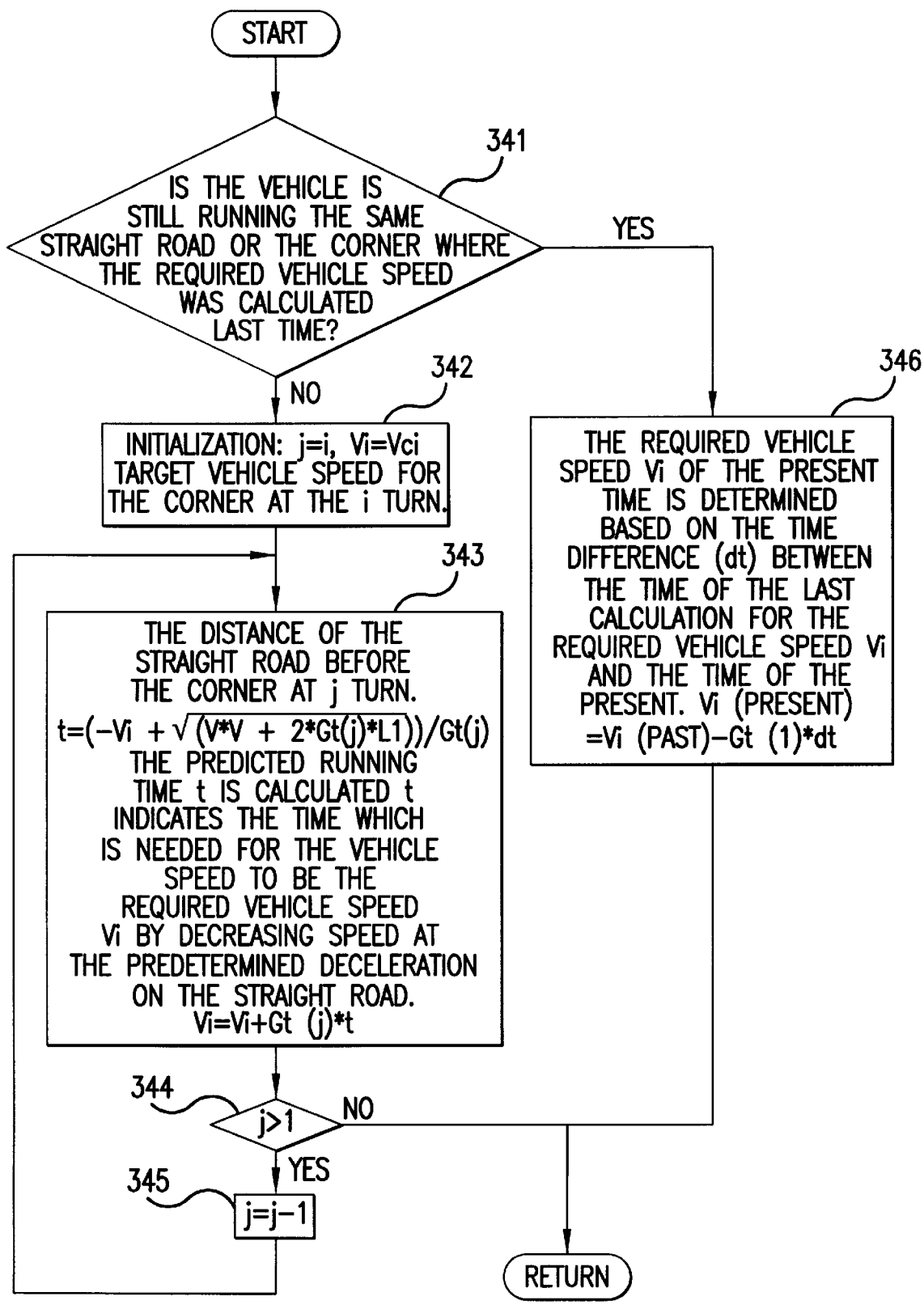
FIG. 23 is a flow chart showing an embodiment of the control to be executed at Step 303 of FIG. 20.

A control flow shown in FIG. 23, which is an example, describes about the concrete contents of Step 303 of the flow in FIG. 20.

FIG. 23 shows the detail procedure for calculating the required vehicle speed Vi. At Step 341, it is decided whether the vehicle is still running the same straight road or the corner where the required vehicle speed was calculated last time. And it is decided whether there is no change in the slope degree or the radius of the corner.

If the answer of 341 is NO, the control flow goes to Step 342, because it is needed to calculate the required vehicle speed Vi again, initialization is executed as j=i, and Vi=Vci at Step 342. Vci indicates the vehicle target speed at the corner at i turn, and j is a number from the corner at i turn.

The navigation system 70 detects the distance of the straight road before the corner of j turn. And a predicted running time t is calculated during running on the straight road. The predicted running time t indicates the time which is needed for the vehicle speed to be the required vehicle speed Vi by decreasing the speed at the predetermined deceleration on a straight road. The predictive running time is calculated by using formula 4.

$$t = (-Vi + \sqrt{(V*V + 2*Gt(j)*L1)}/Gt(j) \quad \text{(formula 4)}$$

At formula 4, Gt (j) indicates the deceleration. L1 indicates the distance of the straight road. At Step 343, the required vehicle speed Vi which is for the straight road before the corner in j turn is calculated by using the following formula.

$$Vi = Vi + Gt(j)*t$$

Vi in the right side of the formula indicates the present vehicle speed. If the vehicle speed is reduced after the vehicle enters the corner, there is possibility that the behavior of the vehicle will be inappropriate and the stability of the vehicle will decline. So the control of Step 343 is executed, in detail, when the vehicle runs on the straight road, before entering the corner j, and the vehicle speed is reduced and when the vehicle enters the corner, the speed of the vehicle is kept almost the same during the rounding the corner.

At Step 344, it is decided whether the corner number j is larger than 1, in other words, it is decided whether the vehicle have reached the target corner in i turn. If the answer of Step 344 is YES, 1 is subtracted from the corner number j, and the control flow returns to Step 343. The loop, for the calculating the required vehicle speed Vi, is constructed by Steps 342, 343, and 345, and the corner number j is a loop counter.

If the answer of Step 344 is NO, the control flow returns. If the answer of Step 341 is YES, the control flow goes to Step 346. The required vehicle speed Vi of the present time is determined by using the following formula. The required vehicle speed Vi of the last time is corrected based on the time difference dt between the time of the last calculation for the required vehicle speed Vi and the time of the present, as a result, the required vehicle speed of the present time is determined. After the correction, the control flow returns.

$$Vi(\text{present}) = Vi(\text{last time}) - Gt(1)*dt$$

Using the control of Step 346, it is possible that Step 302 and Step 305 of FIG. 20 need not be executed N times repeatedly. It can reduce the burden of the calculation of the system.

Instead of the control shown in FIG. 20, it is possible to adapt the following example. The control system has a vehicle speed decreasing point detector which detects only these places where it is necessary to decrease the vehicle speed. The vehicle target speed calculator calculates a vehicle target speed only for the vehicle speed decreasing point. And it has a target deceleration calculator which calculates the decrease speed to the vehicle target speed. And it has a gear stage controller which executes shift down of the automatic transmission 2 only if the decrease speed is more than the threshold.

It is possible for automatic transmission 2 to control other systems to decrease the vehicle speed. In such a case, the information about the corner detected by the navigation system 70, the distance between present position and the corner, and the radius of the corner are used for the control.

For example, if the vehicle speed decreasing point is detected by the navigation system 70, electronic throttle valve 5 is shut to increase the force of engine braking, the oil pressure for the wheel cylinders 72 of the brake system 65 is controlled to increase the force of the braking, and the control of the same speed control, by the vehicle auto drive control system 66, is canceled to decrease the speed.

The predetermined target side direction acceleration is corrected by the coefficient of friction of the road which is determined based on the revolving speed difference by wheel speed 71 and the braking force is controlled.

Furthermore, it is possible to calculate the lateral acceleration based on the vehicle speed during the corner and the radius of the corner, and the control of the deceleration will take into account the result of the calculation. It is a kind of learning control of the target lateral acceleration, for example, if the result of the calculation is larger than the predetermined lateral acceleration, the difference between the calculated value and the predetermined lateral acceleration will be added to the target lateral acceleration; if the result of the calculation is smaller than the predetermined lateral acceleration, the difference between the calculated value and predetermined lateral acceleration will be subtracted from the target lateral acceleration. If data, which are renewed from the learning and are reflecting the tendency of the driver, are used for the control of the lateral acceleration, the control of the down shift, and the other controls, will improve the drivability.

It is possible to execute learning control to correct the target deceleration by the tendency of the driver. For example, it is detected if deceleration occurs during braking before the corner. If the detected deceleration is greater than the predetermined target deceleration, the difference value between the detected decreasing speed rate and the predetermined target value is added to the target deceleration. If the deceleration is smaller than the predetermined target deceleration, the difference value is reduced from the target deceleration.

Reflecting the target decreasing speed which is controlled by the learning control, the decreasing speed is conformed to the driver's liking, and consequently, the drivability is improved.

The following example is also possible. The road slope is detected based on data from the vehicle speed sensor 19, throttle sensor 18, engine revolving speed sensor 15, and the slope sensor 109. The vehicle speed when the vehicle enters the corner is predicted on the basis of the detected data. And if the predicted speed is higher than a permissible speed, the automatic transmission 2 shifts down.

As a result, while the vehicle is running on the up slope, if it predicts that the vehicle speed will decrease enough before the next corner because of the slope, the down shift is prohibited. While the vehicle is running on the down slope, if it predicts that the vehicle speed will increase before the next corner because of the slope, the down shift is executed. These controls improve the drivability.

The following example is also possible. While the vehicle is running before the corner, if the ON signal of the brake switch 22 or OFF signal of the acceleration pedal switch 9 is detected, the automatic transmission 2 shifts down. In other words, while the vehicle is running before the corner, if the driver's intention is to decrease the speed, for example, operation of the brake pedal 21 or the release of the acceleration pedal 8, is detected, so the automatic transmission 2 shifts down. The down shift is executed when the driver's intention of decreasing the speed is detected, so it does not create a bad feeling of drivability.

Furthermore, the automatic transmission 2 is controlled on the basis of the road conditions detected by the navigation system 70, if a diverging point, such as an intersection, is detected on the road ahead of the present position, it is impossible to predict which way the driver will choose. So control of the detecting the corners is stopped or control of the automatic transmission 2 is prohibited. As a result, it is possible to prevent disagreement between the road condition and the driving force of the vehicle, and improve the drivability. This invention is applicable to the automatic transmission which is capable of setting three forward gear stages or four forward gear stages. And this invention is applicable to the vehicle which is equipped an electronic motor as a power source. In this invention, it is possible not to down shift if the deceleration is smaller than the threshold value. And this invention reduces the number of the transmission condition changes, for example, down shift, as possible as it can. So it is able to control the shift shock of the automatic transmission and improve the comfort of the vehicle and drivability. The invention prohibits a down shift during the corner, so it is improves the shift shock and the behavior of the vehicle and stability of the vehicle.

In this invention, transmission is defined as automatic transmission and the operating route information detector is defined as the navigation system. The vehicle speed decreasing point includes anywhere that is detectable by the navigation system and it is necessary to decrease the vehicle speed, for example, a stop place which is determined by traffic regulation, a obstacle including fallen trees and fallen stones, down slope road, low frictional coefficient road, the end of congestion, and so on.

What is claim is:

1. A control system for a vehicle, which has a route information detector which detects route information, and a behavior control system, which is controlled by the route information detected by the route information detector and controls the behavior of the vehicle, said control system comprising:

a means for detecting the accuracy of the detection of the route information; and a changing controller which changes the control of the behavior control system based on the accuracy of the detection of the route information;

wherein the behavior control system includes a transmission of a vehicle.

2. A control system for a vehicle, which has a route information detector which detects route information, and a behavior control system, which is controlled by the route information detected by the route information detector and controls the behavior of the vehicle, said control system comprising:

a means for detecting the accuracy of the detection of the route information; and a changing controller which changes the control of the behavior control system based on the accuracy of the detection of the route information;

wherein the behavior control system includes a brake system of a vehicle.

3. A control system for a vehicle, which has a route information detector which detects route information, and a behavior control system, which is controlled by the route information detected by the route information detector and controls the behavior of the vehicle, said control system comprising:

a means for detecting the accuracy of the detection of the route information; and a changing controller which changes the control of the behavior control system based on the accuracy of the detection of the route information;

wherein the behavior control system includes an engine system of a vehicle.

4. A control system for a vehicle, which has a route information detector which detects route information, and a behavior control system, which is controlled by the route information detected by the route information detector and controls the behavior of the vehicle, said control system comprising:

a means for detecting the accuracy of the detection of the route information; and a changing controller which changes the control of the behavior control system based on the accuracy of the detection of the route information;

wherein the behavior control system includes a vehicle auto drive control system.

5. A control system for a vehicle, which has a route information detector which detects route information, and a behavior control system, which is controlled by the route information detected by the route information detector and controls the behavior of the vehicle, said control system comprising:

a means for detecting the accuracy of the detection of the route information:

a changing controller which changes the control of the behavior control system based on the accuracy of the detection of the route information;

a control system for a transmission, which is controlled by a shift instruction based on a predetermined shift diagram; and a route information detector which detects information on a route that the vehicle follows;

a vehicle speed decreasing point detector which detects a point where it is necessary to decrease the vehicle speed; and a vehicle target speed calculator which calculates a vehicle target speed for the vehicle speed decreasing point;

a target deceleration calculator which calculates a decrease speed to the vehicle target speed;

a vehicle deceleration calculator which calculates a deceleration to make a present vehicle speed be the target speed; and a deceleration judgment device which decides whether said deceleration is larger than a threshold value; and a transmission condition change device which changes a transmission condition to effect an engine braking condition when the deceleration judgment device decides that the deceleration is larger than the threshold value.

6. The control system for a transmission according to claim 5, wherein the point where it is necessary to decrease the vehicle speed includes a corner.

7. A method for controlling a vehicle, comprising the steps of:

controlling a behavior control system of the vehicle based on the information detected by a route information detector, and controlling the behavior of the vehicle;

detecting the accuracy of the detection of the route information; and changing the control of the behavior control system based on the accuracy of the detection of the route information.

8. The method for controlling a vehicle according to claim 7, further comprising the step of:

changing control patterns based on the control patterns which correspond to the route information.

9. The method for controlling a vehicle according to claim 7, further comprising the steps of:

controlling a transmission, which controls the transmission by a shift instruction based on a predetermined shift diagram and route information which is on a route that a vehicle follows; and detecting a point where it is necessary to decrease the vehicle speed; and calculating a vehicle target speed for the vehicle speed decreasing point; and calculating a decrease speed to the vehicle target speed; and a vehicle deceleration calculating a deceleration to make the present vehicle speed be the target speed; and determining whether said deceleration is larger than a threshold value; and changing the transmission condition effects an engine braking condition when the deceleration is larger than the threshold value.

10. The method for controlling a vehicle according to claim 9, further comprising the step of:

detecting a corner as a point where it is necessary to decrease the vehicle speed.

11. A control system for a vehicle, which has a route information detector which detects the location of the vehicle, and a behavior control system, which is controlled by the location detected by the route information detector, controls the behavior of the vehicle, said control system comprising:

means for calculating the location of the vehicle;

means for determining the accuracy of the calculated location of the vehicle by comparing the calculated location with position data, wherein said position data includes areas that are not driveable by said vehicle; and a controller which controls the behavior control system based on the accuracy of the calculated location of the vehicle.

12. A control system for a vehicle, which has a route information detector which detects the location of the vehicle, and a behavior control system, which is controlled by the location detected by the route information detector, controls the behavior of the vehicle, said control system comprising:

means for calculating the location of the vehicle;

means for detecting a curve driving condition of the vehicle;

means for supplying stored curve condition data based on the calculated location of the vehicle;

means for determining the accuracy of the calculated location of the vehicle by comparing the curve driving condition with the supplied stored curve condition data; and a controller which controls the behavior control system based on the accuracy of the calculated location of the vehicle.

13. A control system for a vehicle, which has a route information detector which detects the location of the vehicle, and a behavior control system, which is controlled by the location detected by the route information detector, controls the behavior of the vehicle, said control system comprising:

means for calculating the location of the vehicle;

a sensor for determining a slip condition of the vehicle and the road;

means for supplying slip condition data based on the calculated location of the vehicle;

means for determining the accuracy of the calculated location of the vehicle by comparing the determined slip condition with said supplied slip condition data; and a controller which controls the behavior control system based on the accuracy of the calculated location of the vehicle.

14. A control system for a vehicle, which has a route information detector which detects the location of the vehicle, and a behavior control system, which is controlled by the location detected by the route information detector, controls the behavior of the vehicle, said control system comprising:

means for calculating the location of the vehicle;

a sensor for determining a lane condition of the road;

means for supplying lane information data based on the calculated location of the vehicle;

means for determining the accuracy of the calculated location of the vehicle by comparing the lane condition with said supplied lane information data; and a controller which controls the behavior control system based on the accuracy of the calculated location of the vehicle.

15. A control system for a vehicle, which has a route information detector which detects the location of the vehicle, and a behavior control system, which is controlled by the location detected by the route information detector, controls the behavior of the vehicle, said control system comprising:

means for calculating the location of the vehicle;

means for supplying position data;

means for determining the accuracy of the calculated location of the vehicle by comparing the calculated location of the vehicle and position data wherein the position data includes areas a GPS is inoperable; and a controller which controls the behavior control system based on the accuracy of the calculated location of the vehicle.

16. A control system for a vehicle, which has a route information detector which detects the location of the vehicle, and a behavior control system, which is controlled by the location detected by the route information detector, controls the behavior of the vehicle, said control system comprising:

means for calculating the location of the vehicle;

means for supplying road data;

means for determining the accuracy of the calculated location of the vehicle by comparing the calculated location of the vehicle with road data, wherein said road data includes a location parallel to said calculated location of said vehicle; and a controller which controls the behavior control system based on the accuracy of the calculated location of the vehicle.

* * * * *